(12) United States Patent
Chisholm et al.

(10) Patent No.: US 8,782,043 B2
(45) Date of Patent: Jul. 15, 2014

(54) MULTI-SIDED MEDIA VIEWER AND TECHNIQUE FOR MEDIA ASSOCIATION

(75) Inventors: Alexander S. Chisholm, West Roxbury, MA (US); Kathleen K. Abbott, Ashland, VA (US); Jason Haas, Somerville, MA (US); Robert Stupay, Brooklyn, NY (US)

(73) Assignee: NBC Universal, Inc., New York, NY (US)

( * ) Notice: Subject to any disclaimer, the term of this patent is extended or adjusted under 35 U.S.C. 154(b) by 484 days.

(21) Appl. No.: 12/115,278

(22) Filed: May 5, 2008

(65) Prior Publication Data

US 2009/0019078 A1 Jan. 15, 2009

Related U.S. Application Data

(60) Provisional application No. 60/948,872, filed on Jul. 10, 2007.

(51) Int. Cl.
G06F 7/00 (2006.01)
G06F 17/30 (2006.01)

(52) U.S. Cl.
USPC ......................................... 707/736

(58) Field of Classification Search
None
See application file for complete search history.

(56) References Cited

U.S. PATENT DOCUMENTS

| | | | | |
|---|---|---|---|---|
| 5,678,015 A | * | 10/1997 | Goh | 715/782 |
| 5,745,109 A | * | 4/1998 | Nakano et al. | 715/838 |
| 6,016,145 A | * | 1/2000 | Horvitz et al. | 715/788 |
| 6,043,818 A | * | 3/2000 | Nakano et al. | 715/851 |
| 6,266,098 B1 | * | 7/2001 | Cove et al. | 348/563 |
| 6,300,957 B1 | | 10/2001 | Rao et al. | |
| 6,377,259 B1 | | 4/2002 | Tenev et al. | |
| 6,628,312 B1 | | 9/2003 | Rao et al. | |
| 6,654,761 B2 | | 11/2003 | Tenev et al. | |
| 6,892,189 B2 | | 5/2005 | Quass et al. | |
| 6,901,555 B2 | | 5/2005 | Hida et al. | |
| 6,954,897 B1 | * | 10/2005 | Noguchi et al. | 715/234 |
| 7,013,435 B2 | * | 3/2006 | Gallo et al. | 715/850 |
| 7,089,238 B1 | | 8/2006 | Davis et al. | |
| 7,107,266 B1 | | 9/2006 | Breyman et al. | |

(Continued)

OTHER PUBLICATIONS

Apted et al., Sharing Digital Media on Collaborative Tables and Displays, p. 1-4 (In Proceedings of The Spaces In-between: Seamful and Seamless Interactions; in conjunction with UbiComp 2005, Tokyo, Japan, Sep. 1, 2005).*

*Primary Examiner* — Taelor Kim
(74) *Attorney, Agent, or Firm* — Marshall, Gerstein & Borun LLP

(57) ABSTRACT

A system provides a multi-sided media viewer capable of displaying media assets from an electronic archival news and content database. Each side of the media player contains different information regarding the media asset. A primary side of the media asset may display a media asset related to an educational program, such as a course curriculum or the like. The secondary sides of the media viewer may contain additional information regarding that media asset, including personalized information generated by a system user as well as automatically populated information, such as information collected from other external news services or content providers. The system may further provide an educational game in which users are encouraged to find and draw connections between media assets to create an interconnection of related news items. The multi-sided media viewer may be a two-sided cue card, or a multidimensional news or content element having any number of sides depending on the additional information to be displayed with the media asset.

35 Claims, 32 Drawing Sheets

(56) References Cited

U.S. PATENT DOCUMENTS

| | | | |
|---|---|---|---|
| 7,134,095 B1 * | 11/2006 | Smith et al. | 715/860 |
| 7,178,099 B2 | 2/2007 | Meyer et al. | |
| 7,216,305 B1 * | 5/2007 | Jaeger | 715/849 |
| 7,225,175 B2 * | 5/2007 | Higgins et al. | 706/45 |
| 7,508,377 B2 * | 3/2009 | Pihlaja et al. | 345/161 |
| 7,661,071 B2 * | 2/2010 | Blanco | 715/782 |
| 2001/0028369 A1 * | 10/2001 | Gallo et al. | 345/848 |
| 2005/0264555 A1 * | 12/2005 | Zhou et al. | 345/419 |
| 2006/0095976 A1 * | 5/2006 | Torres et al. | 726/28 |
| 2009/0125801 A1 * | 5/2009 | Algreatly | 715/234 |
| 2009/0222768 A1 * | 9/2009 | Roe et al. | 715/850 |

\* cited by examiner

FIG. 8

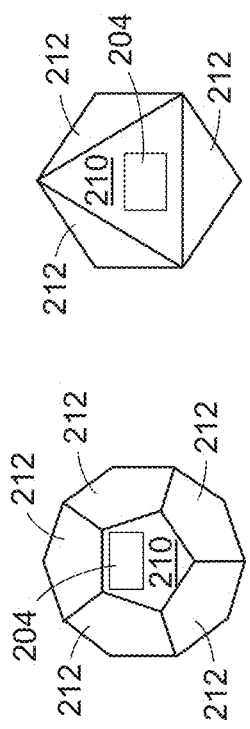
FIG. 10C
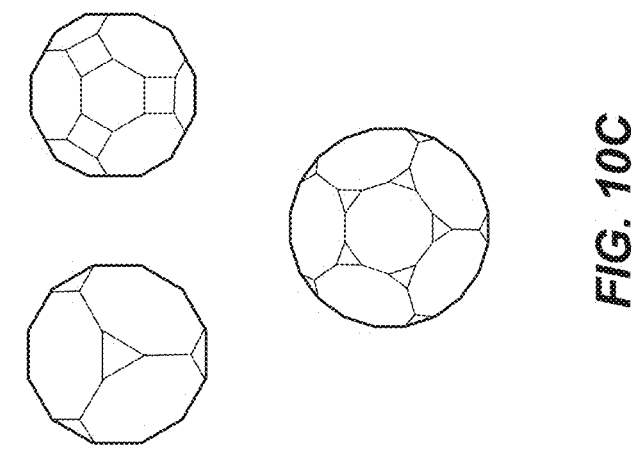
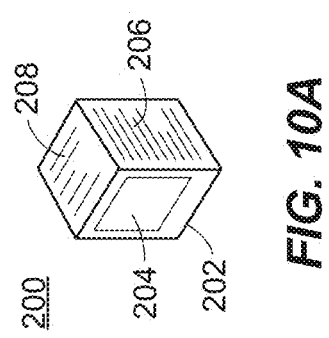
FIG. 10A
FIG. 10B

FIG. 15

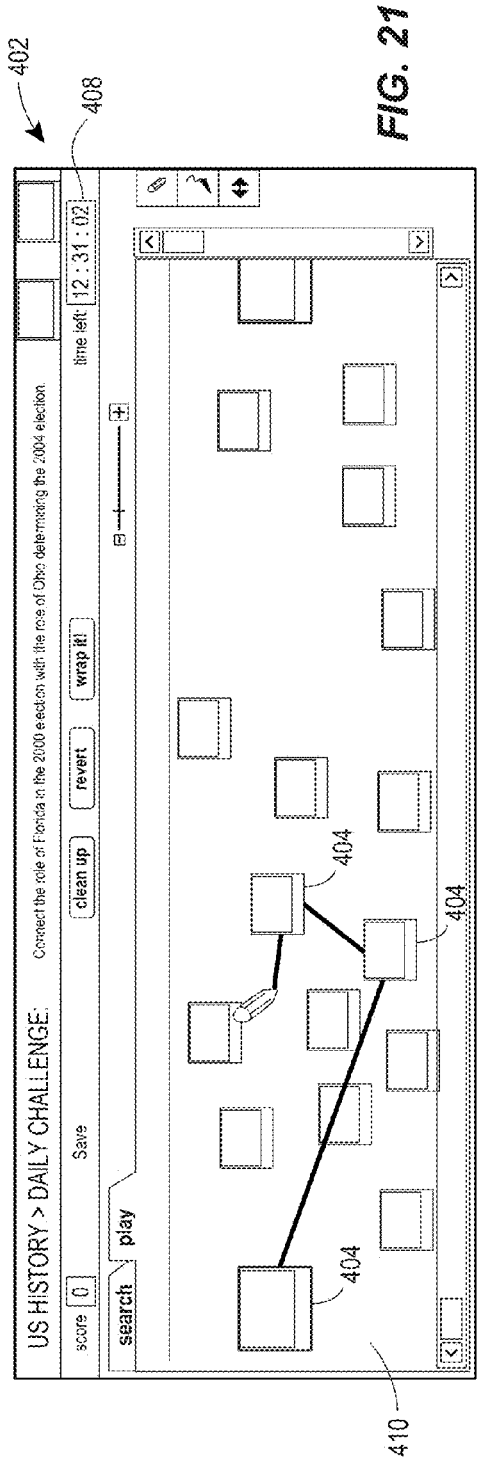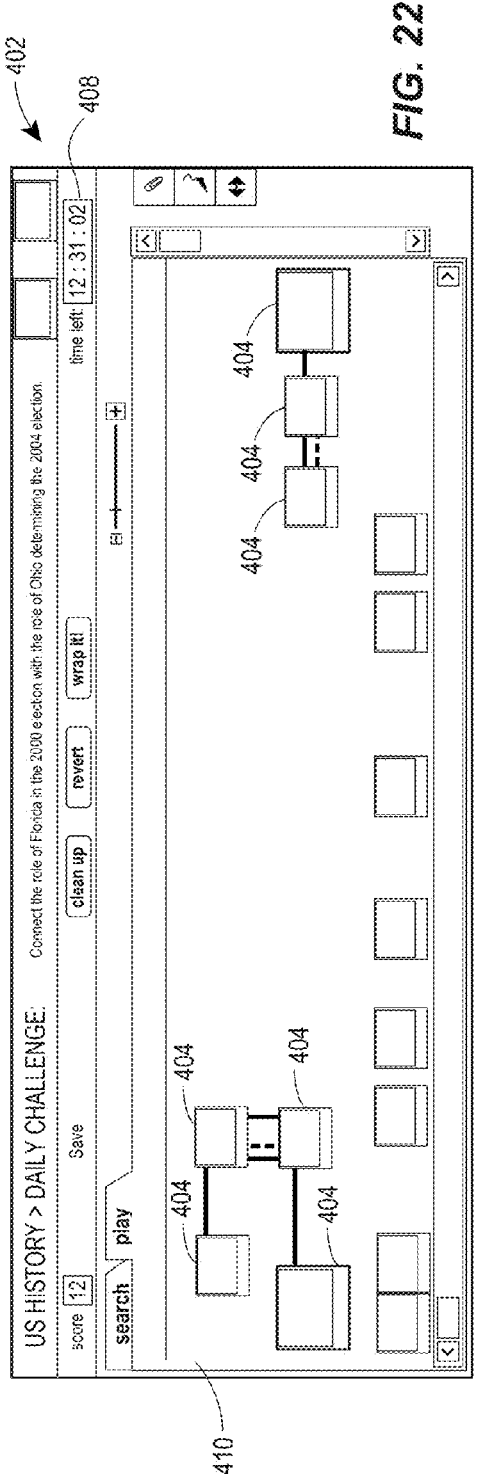

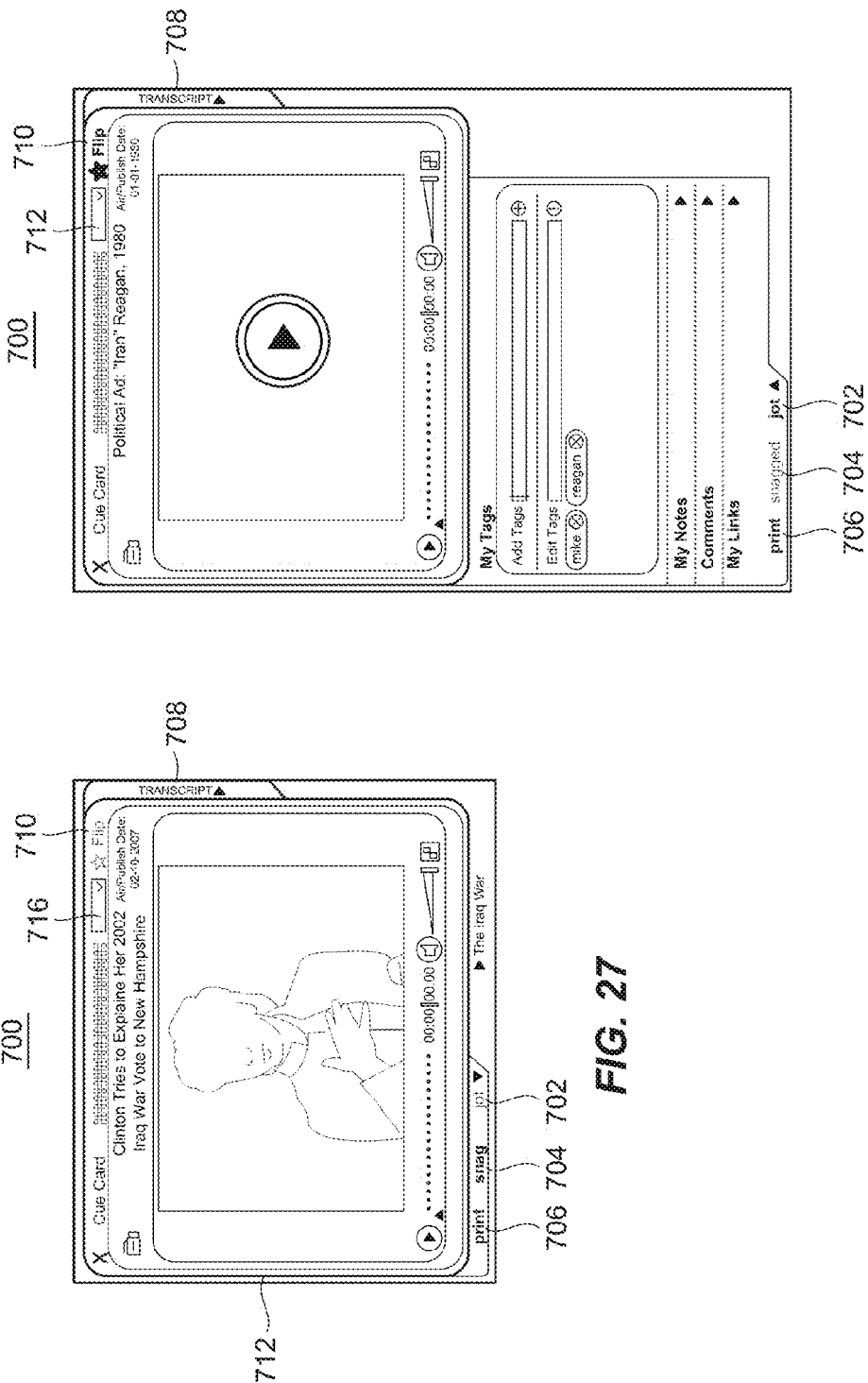

MYSTACK

List View | Thumbnail View | Sort By: Category ▲ | MANAGE CATEGORIES

SHOW: All | Categories | Faves | Tags obama 2008 elections hey politics rudy reagan mike racial clinton 1-10 of 11 › »

| CATEGORY ▲ TITLE | | DESCRIPTION | TYPE | | A.R./PUBLISH DATE EVENT DATE | |
|---|---|---|---|---|---|---|
| | The Experience | The current change vs. experience debate | | Video | 02/03/2008 | ⊗ |
| | Washington Post | Taylor is the author of "See How They | | Video | 09/27/1990 | ⊗ |
| ☆ | On the trail with Mike | In an interview on the Today show, Mike | | Video | 12/05/2007 | ⊗ |
| | Democrats Trade Barbs | Barack Obama and Hillary Clinton traded | | Video | 01/22/2008 | ⊗ |
| ☆ | Presidential | Brewer discusses the 2008 election and | | Video | 12/26/2007 | ⊗ |
| | Political Ad "Iran" | In this political ad, Ronald Reagan | | Video | 01/01/1980 | ⊗ |
| | Clinton Steps Up | Hillary Clinton steps up attacks against | | Video | 12/03/2007 | ⊗ |
| | Rudy's Last Stand? | On the day of the Florida primary, NBC's | | Video | 01/29/2008 | ⊗ |
| | Ferraro Resigns from | Geraldine Ferraro resigns from Hillary | | Video | 03/13/2008 | ⊗ |
| | Clinton, Obama Spar | The Democratic contest has erupted into | | Video | 01/14/2008 | ⊗ |

MULTI-SIDED MEDIA VIEWER AND TECHNIQUE FOR MEDIA ASSOCIATION

This application claims the benefit of Provisional U.S. Patent Application No. 60/948,872, filed Jul. 10, 2007, the entirety of which is expressly incorporated herein by reference.

FIELD OF TECHNOLOGY

The present disclosure relates generally to collecting and displaying content on a computer and more particularly, to collecting and displaying content in a dynamic, user adjustable manner.

DESCRIPTION OF THE RELATED ART

For years, educators have sought ways to enrich educational environments by moving learning to web-based learning. The World Wide Web provides a wealth of information that in the right hands would be a valuable learning resource to students. In some ways, however, the sheer volume of information available through the World Wide Web and the lack of categorization of such information has hindered such efforts. Also hindering such efforts is a lack of an integration between content providers, who are the sources of a great deal of the media content available on the world wide web and which might be useful for students, and curriculum designers and teachers. Furthermore, there is also a lack of an effective means of displaying information to students in a way that allows students to make mental connections between the content available on the World Wide Web. As a result, students do not have a robust means for aggregating content into one centralized location, nor do they have a means for drawing connections between that content to allow the student to visually connect content in a way that shows an elevated, in-depth understanding of a topic of educational interest.

SUMMARY OF THE DISCLOSURE

In accordance with an example, provided is a system for displaying an association of media content with information stored in a database, the system comprising: a memory area for storing the media content for display to a user; a processor to execute computer-executable instructions for, identifying the media content to be displayed to the user, and displaying the media content and associated information to a user in a manipulable manner; an archival news system to identify associated information stored in the database and related to the media content; and a media player generator to generate and display a multi-sided news element having a primary side to display the media content and at least one secondary side to display the associated information, wherein the media player generator is capable of interconnecting one of the primary side and the at least one secondary side of the multi-sided news element to another news element.

In some examples, the multi-sided news element is a two-sided cue card, while in other examples, the multi-sided news element is a three-dimensionally depicted news element containing more than two sides. The primary side may include a first tab that when selected by a user exposes a window through which the user may enter personalized information related to the media content. In some such examples, the at least one secondary side may be populated with the personalized information. In some examples, the primary side further includes a video media player for playing the media content.

In accordance with an example, provided is a computer-readable medium for displaying an association of media content with information stored in a database, comprising computer-executable instructions that, when executed, cause a computer to: identify the media content to be displayed to the user; identify information stored in the database and related to the media content; associate the identified information with the media content in a multi-sided news element having a primary side to display the media content and at least one secondary side to display the associated information; displaying the multi-sided news element in a manipulable manner to allow a user to adjust the depiction of the multi-sided news element from displaying one of the sides of the multi-sided news elements to displaying another side of the multi-sided news elements, wherein the multi-sided news element is either, a two-sided cue card, or a three-dimensionally depicted news element containing more than two sides, and wherein the computer-readable medium comprises further instructions that when executed cause the computer to manipulate the depiction of the displayed multi-sided news element to visually simulate moving the multi-sided news element in a three-dimensional space on a display.

In accordance with another example, a method for displaying media content and related information is provided and includes: creating a graphical display of a multi-sided news element having a primary side and at least one secondary side each variably visible to a user through manipulation of the graphical display of the news element; providing a media playing on the primary side for playing the media content; and displaying the related information on the at least one secondary side.

In accordance with some examples, the method further includes: displaying a plurality of the multi-sided news elements, each pertaining to a different media content to be displayed on a respective primary side and each having different related information to be displayed on a respective secondary side; correlating at least some of the plurality of multi-sided news elements based on the related information of the plurality of multi-sided news elements; and polling a user to correlate at least one other of the plurality of multi-sided news elements, and displaying the user correlation.

BRIEF DESCRIPTION OF THE DRAWINGS

FIG. 8 illustrates a multi-sided cue card (or news element) generated by the education and archival news system, in particular showing a primary side transcript drawer of the cue card;

FIGS. 10A-10C illustrate multi-sided news elements that are three-dimensional in graphical form and each having a primary side and multiple secondary sides;

FIG. 15 illustrates a welcoming web-page in accordance with the example of FIG. 14;

FIGS. 19-22 illustrate example depictions of system by which a user is able to draw connections between various multi-sided news elements generated for the example education and archival news system of FIG. 14;

FIG. 27 illustrates another multi-sided cue card (or news element) generated by the education and archival news system, in accordance with an example;

FIG. 28 illustrates the multi-sided cue card of FIG. 27 with a drawer exposed;

FIG. 35 illustrates a My Stack screen listing multi-sided cue cards in accordance with an example; and FIG. 36 illustrates the My Stack screen of FIG. 35 and showing a manage categories pop-up window.

DETAILED DESCRIPTION

The present application describes a web-based educational system where highly motivated and competitive students and their teachers can interact with historical and current events media from news sources, major print partners and other content providers to practice multiple choice drills, play games, practice their writing through blogs, and communicate with friends as part of an immersive learning environment that complements classroom and textbook education. The product may be designed to support curricula leading to the College Board's Advanced Placement (AP) exams in courses such as (1) U.S. History, (2) Government and Politics-U.S., and (3) English Language and Composition. Over time, the online content, activities, and games will be expanded to support multiple curricula across multiple grade levels and subject areas, from elementary to secondary schools to colleges and universities to informal and lifelong learning, as well as from the social studies and language arts to language learning to mathematics, sciences, and engineering.

As explained in more detail below, the education system may be programmed to communicate with existing education focused web-based resources, including teacher-centered databases such as HOTCHALK (www.hotchalk.com) as well student-centered interactive social networking environments such as FACEBOOK (www.facebook.com). Integration with HOTCHALK will allow archival media and basic functionality that may support teachers' management of lesson plans, teaching activities, and student assignments. Integration with FACEBOOK will enable students to interact with and circulate media as part of the social networking utility's new application platform.

Figure 1:
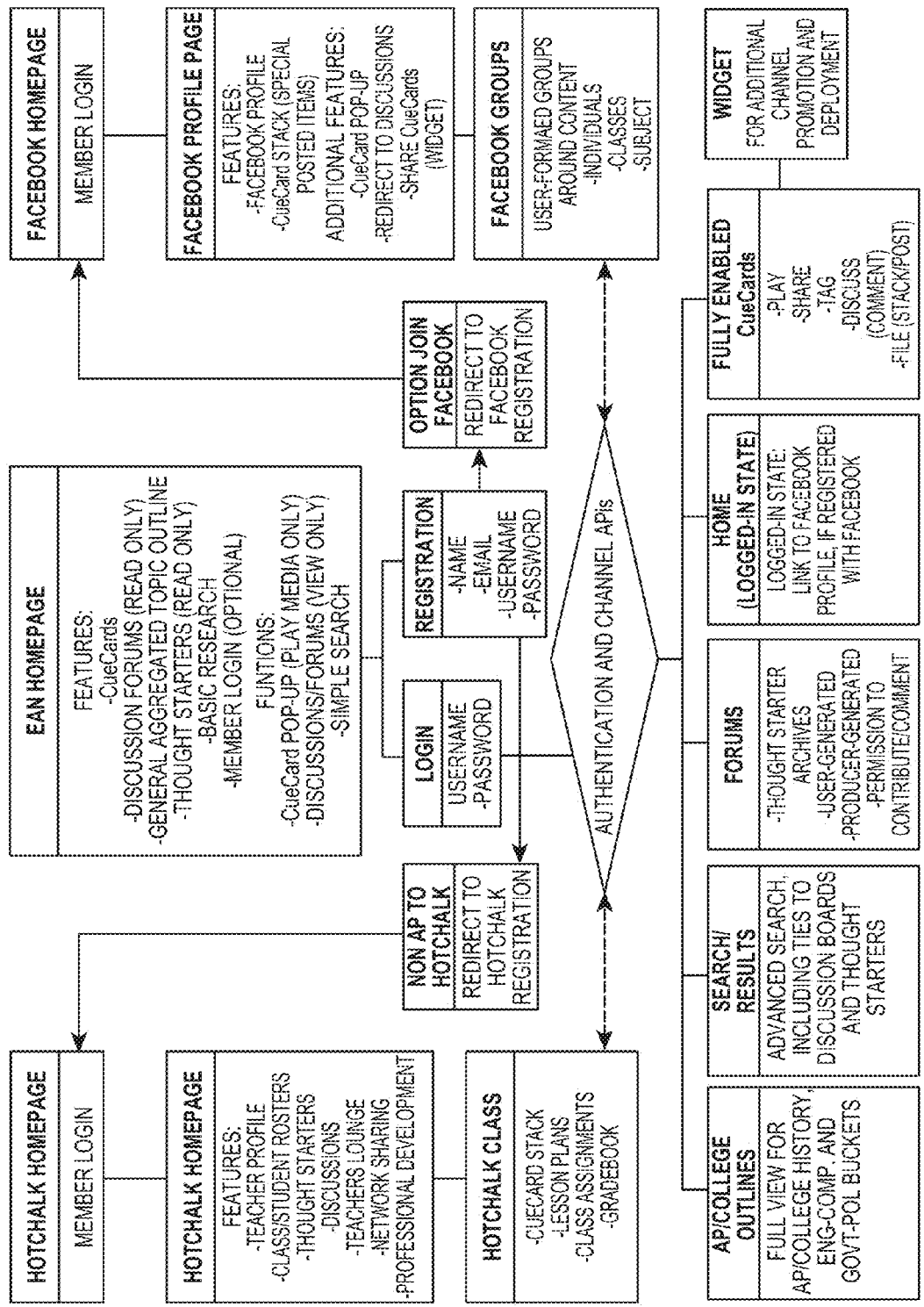
FIG. 1 illustrates a block diagram of an example education and archival news system integrated with existing educational database systems.

A general schematic of the web-based educational news system is shown in FIG. 1 in an environment integrated with existing education databases, which may be web-based or otherwise. For the present application, the integrated educational and archival news system will sometimes be referred to with the abbreviation (EAN system). The present application is not limited to the particular implementations described however. The features discussed herein are examples of the capabilities of a system capable of integrating online educational environments with databases of media assets to allow students free access to potentially relevant content and to allow students to develop their own hand selected content libraries. The techniques described herein, in particular, the integrated, multi-sided media player and interconnectivity functionality may be used in other applications, indeed any application where an electronic media asset is available and may be aggregated with information. The media player could be used in data and information laden environments, such as business, legal, financial, and scientific environments, to display information in a new more user friendly graphical way. The display of information in a multi-sided environment improves the way complex information is presented but also, as discussed further herein, allows users to more quickly link information elements to other information elements. In this way, users of an information-laden environment can create their own interrelations between information elements thus expanding the knowledge base of all users.

The EAN system will be accessible to students, teachers and parents alike. Students will have access to navigate an archive that includes media from major broadcast news organizations plus articles from a variety of print media partners, as the students learn important facts, explore ideas, make critical connections between the media assets and curricular concepts and develop critical thinking skills essential for AP success. The EAN system ties archival news and popular culture to learning goals through on-going challenges through the school year. This system may support learning in ways that teachers and textbooks do not, allowing students to experiment with and develop new strategies to master content and then apply those skills in the classroom, through their homework, and—at the end of the experience—on their tests and exams. The educational and archival news system offers a learning community that may be designed to exclusively support segments of students such as exceptionally talented high school students taking rigorous and competitive AP courses and exams. By integrating the EAN system with HOTCHALK, the system will enable students in a greater number of grades and courses to leverage media assets and functionality as part of a wide variety of teacher-designed lesson plans.

The EAN system may allow teachers to support their teaching with materials from an electronic archive that includes media from major broadcast news organizations plus articles from a variety of print media partners, enabling them to better illustrate important facts and ideas, while empowering their students to develop critical thinking skills essential for AP success. The EAN system is the only online media and gaming environment that helps teachers make connections between news and popular culture with a rich-media, interactive, and online tools that are refreshed daily, supporting their classroom, homework, and testing activities. The educational and archival news systems may support teachers by building a bridge between traditional teaching strategies and the interactive and mobile media culture their students occupy outside of school. The educational and archival news system will support a community of teachers interested in using new media resources in the classroom by creating a place for discussion forums, student evaluation, and lesson planning and teaching recommendations. Through HOTCHALK, or other databases systems, teachers are able to leverage media assets from the educational news system and functionality as part of their own lesson plans and class assignments.

For parents, their kids will have an effective tool for accessing archival news from local, national, and world wide news databases, including cutting-edge research, articles, reports, and the like developed, with the goals and learning strategies of curriculum-based organizations, such as The College Board. The system may allow parents to track their child's progress as well, to allow parents to more quickly receive updates on and monitor their child's performance and progress in core curricula, and to allow parents to better strategize on the ways to help their children advance educationally.

Figure 2:
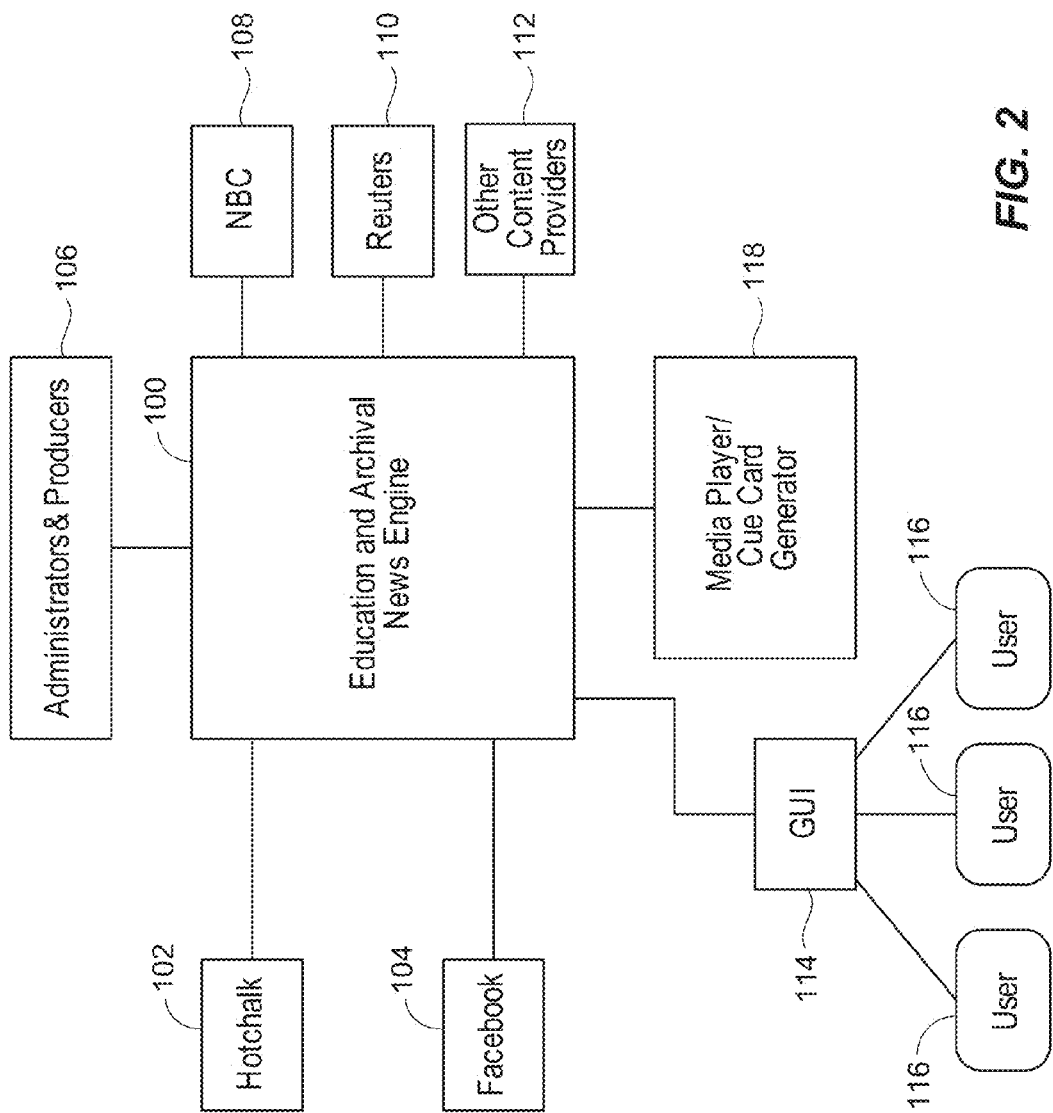
FIG. 2 illustrates a block diagram of an example implementation of an education and archival news system.

The EAN system may be continuously linked with electronic networks (proprietary and open) of content providers to access content from existing archives, ongoing news, and limited news alerts. FIG. 2 shows a block diagram of the EAN system. An EAN engine 100 is coupled to various external electronic databases, HOTCHALK database 102 and FACEBOOK database 104 in the illustrated example. An administrator and producer 106 electronically control system operation by setting system policy, functionality, and feature sets. The engine 100 is connected to content provider databases 108-112 from which the system access media asset to be displayed by a graphic user interface from a generator 114 to users 116 (i.e., students parents, and teachers). The GUI presents the information in a multi-sided media player created by a media player generator 118 also connected to the engine 100.

Returning to FIG. 1, various features of an example implementation of an educational and archival news system are provided. Several of these features are discussed below.

New users may be registered with the system in various ways. At the time of new registration, a user may be prompted to perform a system check to make sure his/her computer is compatible for the best experience with the educational news system. The system check may check the user's computer for a compatible web browser, a compatible plug-in required for playing the media assets, screen resolution, and high speed internet connection—link to test your connection speed. The hardware requirements may, for example, call for a Pentium-class processing running at 800 MHz or faster. Various operating systems may be used, including, Microsoft WINDOWS 2000, XP, or above, and MAC OS X. Further, content display may be achieved through enabling software and/or plugins thereto such as ADOBE FLASH 8.0 or the like. Standard web browsers may be used as well. One way in which an EAN system differs substantially from the state of the art is with respect to the media player that is built to present a multi-faceted (or multi-sided) cue card, with one side displaying aggregated video, print, or other news, and the other side displaying adjustable fields of information associated with video, print, or other news on the opposite side of the display card. In some examples, as explained further below, cue cards will be designed with more than two sides. As the sides or facets of the media player (called cards in a two sided form and higher dimension multi-sided news elements in higher sided configurations), the system must allow the user to fully rotate, expand, and condense the media asset so that students can collect them, organize them, and link them in their own personalized web page.

Parents and students may be able to register with the educational news system through an on-line registration process that may include, for example, information such as a iCue Display Name, password, select avatar, links to external supported websites, such as www.MSNBC.com, as well as personal information. The system may also allow parents and students to opt into or out of special programs or communications based on geographic or demographic information. The registration may include parent information as well as school information, and each separate from student information, depending on the implementation. The registration may also include course work that the student is to take, as well as textbooks, and other traditional information sources for the material. User Roles FIG. 1 shows an example implementation of an EAN system that executes on a computer. The EAN system executes instructions to display a web-based homepage of content, such as cue cards (discussed below), discussion forums, topical outlines, member login, and other functionality as shown. The EAN system is connected to login and registration modules requiring certain data as shown. Registration may allow an EAN system user to be redirected to other websites with media and news content, such as FACEBOOK and HOTCHALK, both of which are generally shown (in module format). Through login and profile page access to these services, a student or user of the EAN system may join groups or classes of other students for educational game play, conversation, etc.

Once a student has been authenticated via the EAN system login and any logins through associated web-based, or other, information and media resources (e.g., FACEBOOK and HOTCHALK), the student is authenticated and allowed to access EAN modules. Therefore, an authenticated student may be able to access AP/college outlines, search results, forms. Home data such as profile data, and cue cards, depending on the privileged. As further shown in some examples, authentication may provide access to other information through executable widgets that automatically pull and display content from other databases, whether internet-based or otherwise.

Figure 3:
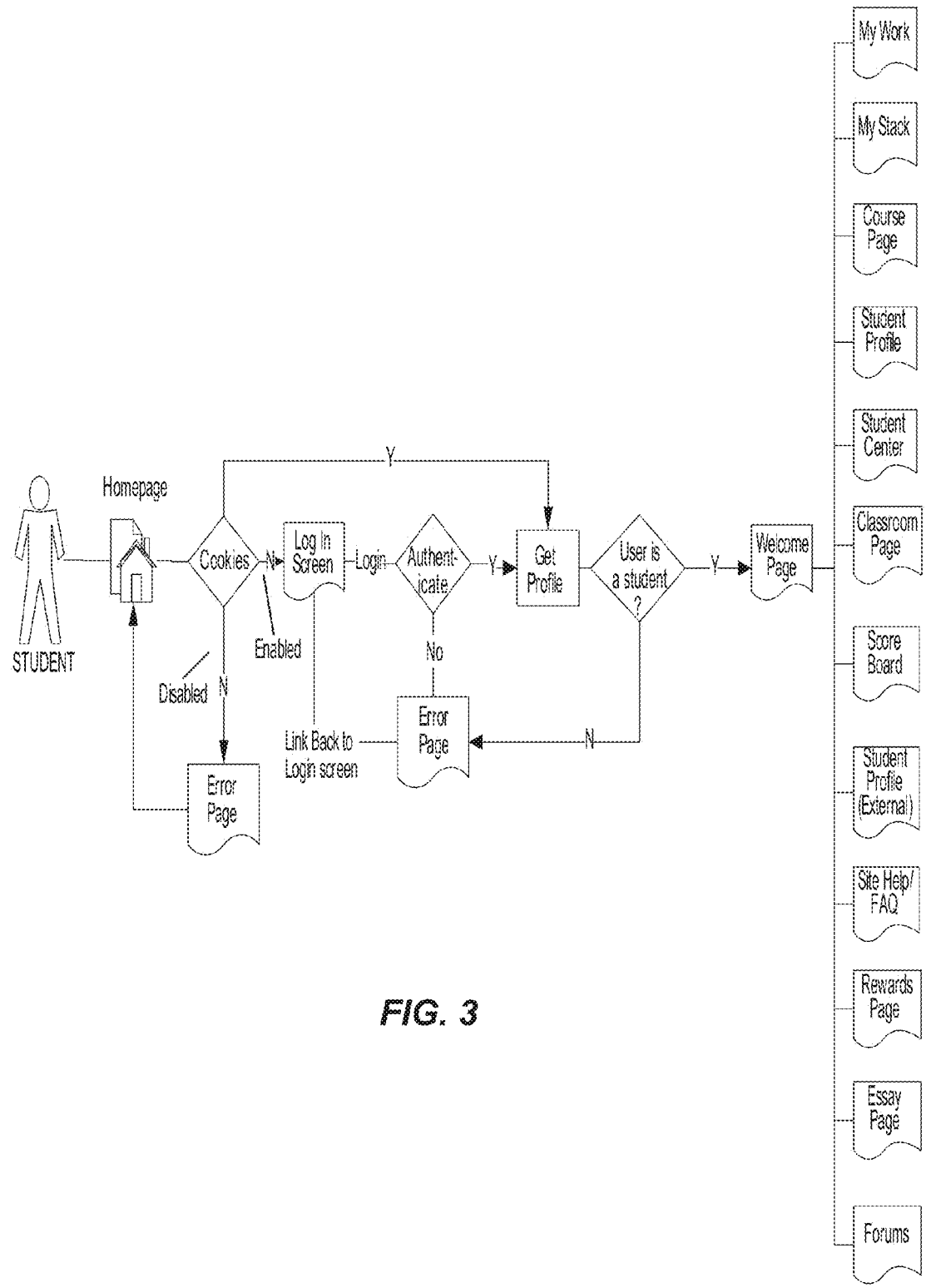
FIG. 3 illustrates a flow diagram showing a web-based interface of an education and archival news system for a student accessing the system.
Figure 4:
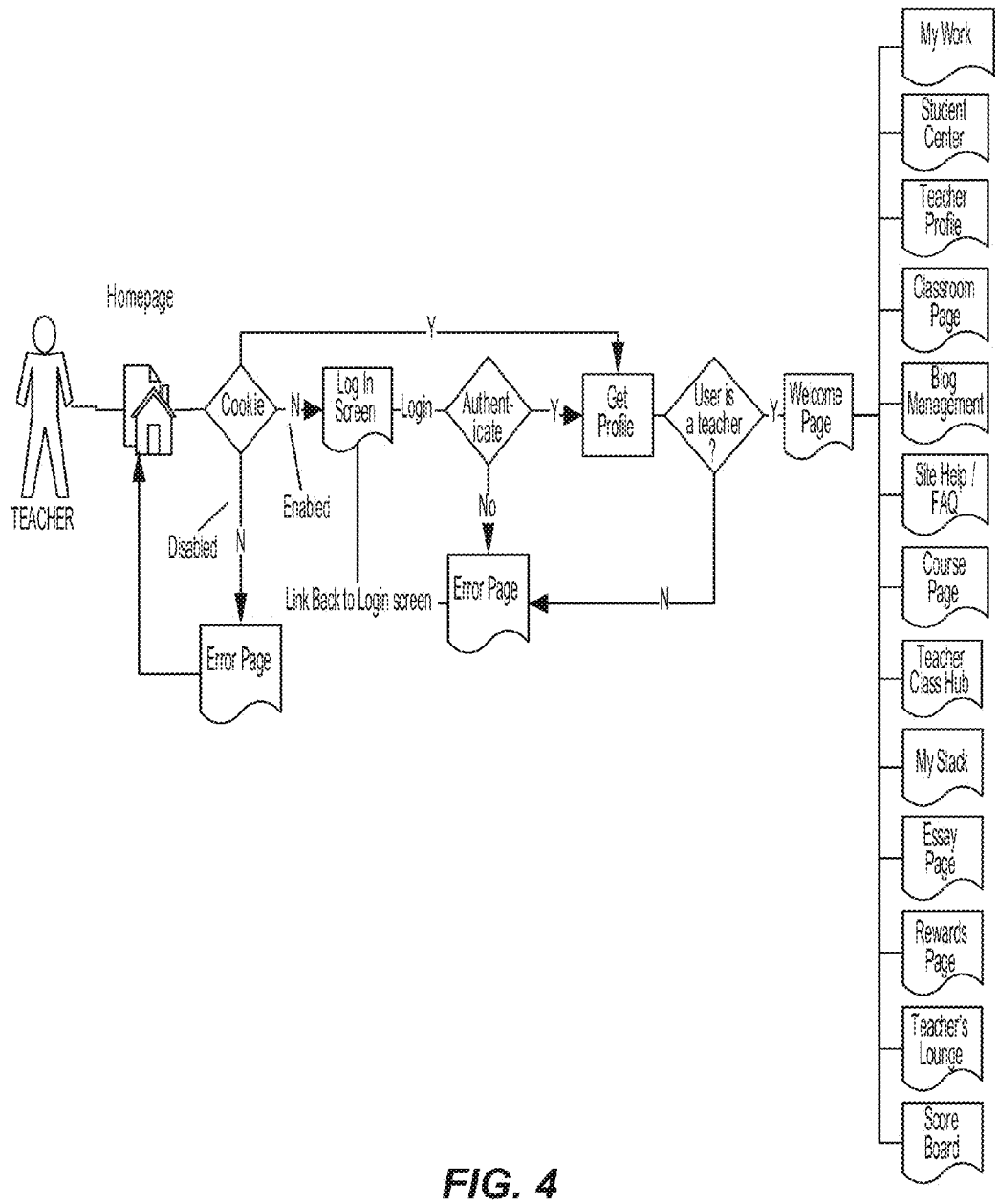
FIG. 4 illustrates a flow diagram showing a web-based interface of an education and archival news system for a teacher accessing the system.
Figure 5:
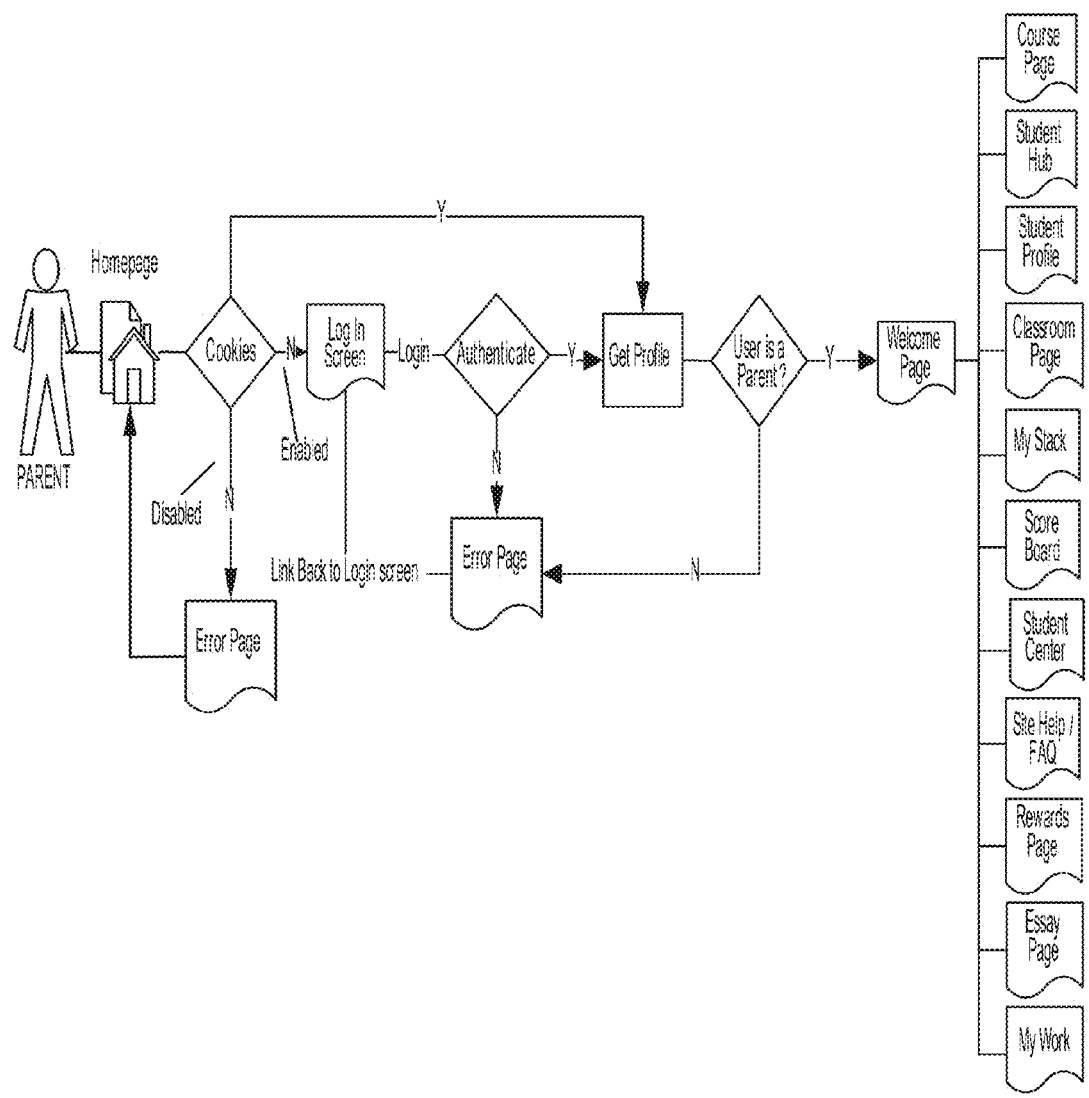
FIG. 5 illustrates a flow diagram showing a web-based interface of an education and archival news system for a parent accessing the system.

FIG. 3 shows a block diagram of an example student interaction with the system. The illustration shows a login portion of the procedure as well as the student accessible modules: Welcome (or Home) Page with links to various of a Student Profile Page, Student External Profile Page, My Stack Page, Forums Page, Student Center Page, Classroom Page, All Course Pages, Scoreboard Page, Rewards Page, Essay Page, My Work Page, and Site Help/FAQ Page. While these are described as pages, alternatively they may be portions of the same webpage. FIG. 4 illustrates a block diagram of teacher interaction with the system, including teacher accessible modules: Welcome (or Home) Page, Teacher Profile Page, Teacher External Profile Page, Teacher Class Page, Classroom Page, Scoreboard Page, All Course Pages, Rewards Page, Essay Page, My Stack Page, Student Center Page, Teachers' Lounge Page, My Work Page, and Site Help/FAQ Page. FIG. 5 illustrates a block diagram of parent interaction with the system including parent accessible modules: Welcome (or Home) Page, My Stack Page, Student External Profile Page, Student Center Page, Classroom Page, All Course Pages, Scoreboard, Rewards Page, Essay Page, My Work Page, and Site Help/FAQ Page. More on these various view pages will be described below.

Before moving into the specific page templates, the specialized media player generated by the generator 118 is discussed. The media player enables viewing and annotation as valuable features of an EAN system that functions across all pages and activities. The media player is displayed as part of a cue card that in a sense acts as the "currency" of the EAN experience, supporting student understanding of media asset, facilitating teacher use of media in the classroom and during assignments, sparking online discussions, and enabling game play.

In general a basic cue card may contain a media player with display controls, content branding, EAN inventory number, and basic bibliographic information in its "face," without any additional related content visible. If a user decides to "flip" the card over on-screen, they will see other content.

Students will be able to view and collect cue cards that contain educational content that may be related to education coursework set forth under the course tab or the student center. These cue cards, for example, may function as media players that are capable of playing video and/or audio clips, as well as static forms of text and images, such as but not limited to PDFs (ADOBE Portable Document Format), JPEGs (Joint Photographic Experts Group Standard), and TIFFs (Tagged Image File Format), associated with a particular topic of interest to the student. The EAN system may periodically (or continuously) search existing news and other media asset databases for news items associated with topics identified from the course tab, student center, or student profile. The available news items, which may be accessed through cue cards, may be collected at times specified by external databases. For example, the EAN system may be placed in an await mode, where the collection of news occurs under control of the external news database. For example, as news stories and media asset are created, upon creation and coding with a keyword, those news stories and media asset are automatically transmitted to the educational and archival news system, which may then determine if any of such news item are relevant to topics identified in the course tab, student center, or student profile. While the news item (or content) may be stored locally in the educational news system, in other examples news items will be retained on the database of the source or provider, and the cue card system may simply link to these original news sources displaying the content to the student or user in a streaming manner though the media player portion of the cue card.

Figure 6:
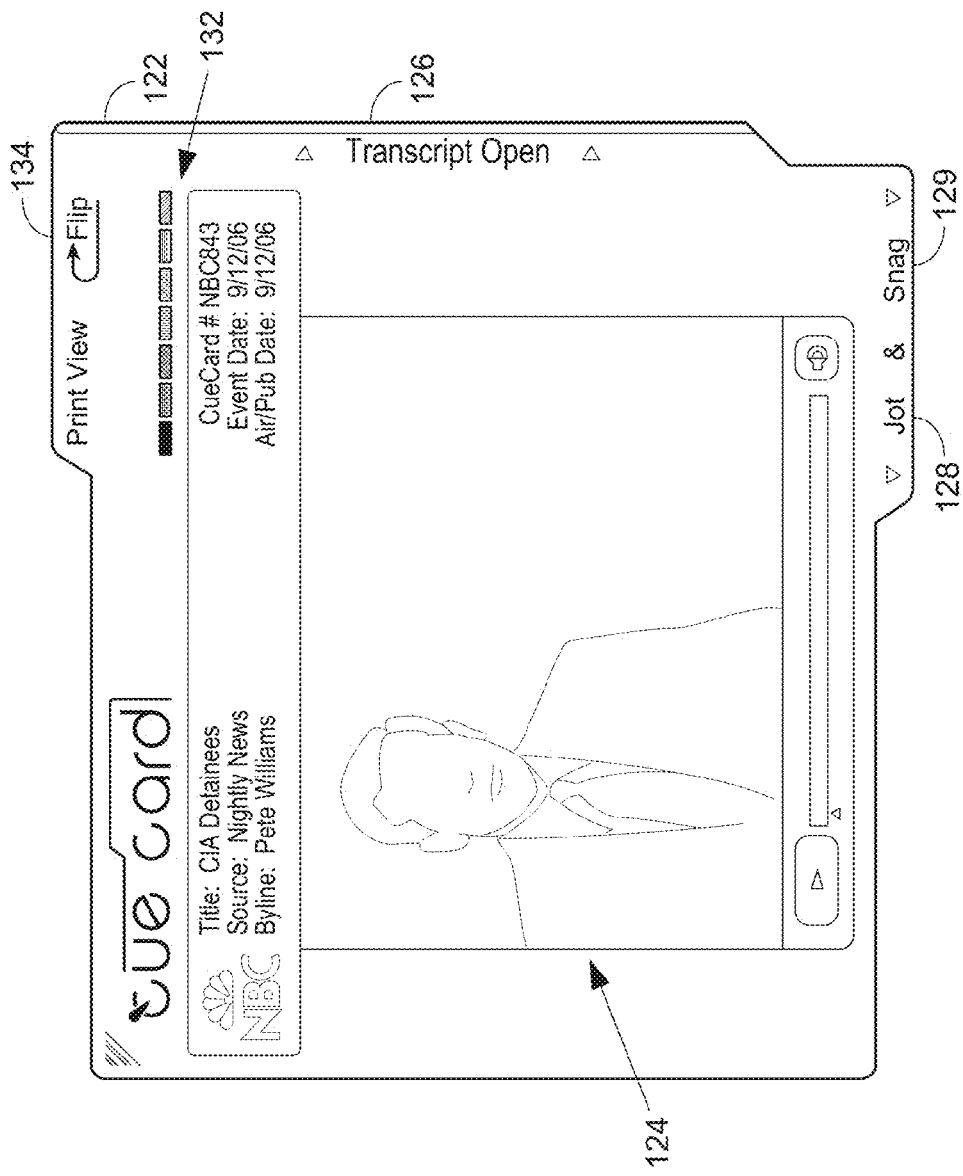
FIG. 6 illustrates a multi-sided cue card (or news element) generated by the education and archival news system, in particular showing a primary side media player of the cue card.

FIG. 6 shows an example cue card 122 with a media player 124 broadcasting a news item originally broadcast as part of a network television broadcast. The cue card has a title section, which may list the news source, and a byline. The cue card 122 may also in some instances also list the event of the underlying news item at interest during the broadcast, the data of the broadcast, and an ID number associated with the cue card, where each cue card would have a different ID number. In fact, in some instances the single cue card 122 may contain multiple modified variations, for example when multiple students save annotations, keywords, and other personalized content on a drawer of the cue card. As a result, various cue cards may be nearly identical ID numbers, but with some slight variation to identify that the cue card is modified version of another existing cue card.

FIG. 6 shows the front of the cue card 122 that contains the media player 124. If the selected asset is a video and/or audio asset, the student should be able to play the video or view the transcript associated with the asset by selecting a transcript drawer button 126. If the selected asset is an Image (JPEG, e.g., .jpg files), the student will be able to view, resize (Small/Large), move and zoom into the JPEG image, and view a scanned OCR (optical character recognition) associated with the asset. The media player/cue card generator 118 controls this display, storage of information, and graphical display of the cue card. The generator 118 may control all aspects of the operation of the cue card or news element, although in other examples.

The cue card 122 may have three different buttons at the lower edge: a jot button 128 for editing or personalizing metadata to be associated with the news item a snag button 129 for capturing the cue card into a students "My Stack."

In the upper right hand corner of some cue cards (see, e.g., FIGS. 27-34), there is a "Favorites" feature indicated by a clickable yellow star button. By clicking the star, a user has indicated this cue card is one of their "Favorites" and will be categorized as such within the user's "My Stack" (see, e.g., FIGS. 35 and 36).

In addition to personalizing the cue card with metadata, the user can also alter the color of the cue card. A pull-down menu or color bar 132 for a user to color code an individual cue card is provided. The user may select from a color pallete containing 6 or more choices. After selecting a color, the cue card outer frame may change to the selected color. This color coded cue card is added to this user's "My Stack" page (see e.g., FIGS. 35 and 36), where the user can organize and sort the cue cards by color. Within the My Stack Page, the user can pre-define a label associated with each color.

Figure 7:
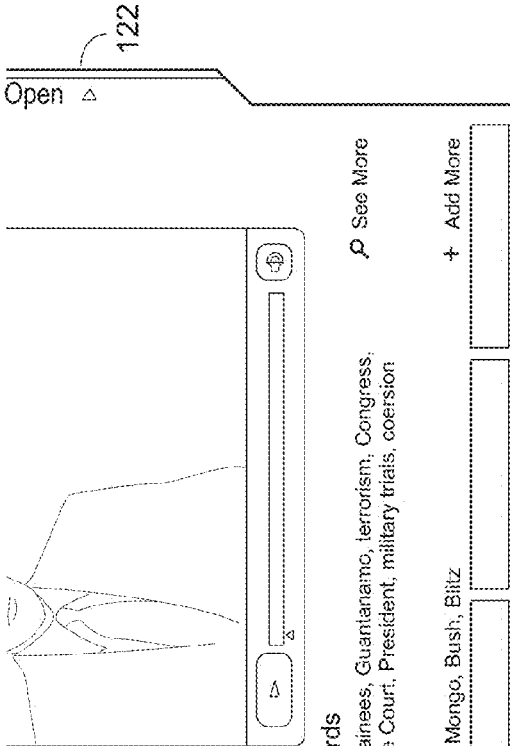
FIG. 7 illustrates a multi-sided cue card (or news element) generated by the education and archival news system, in particular showing a primary side personalized information entry area of the cue card.

FIG. 7 illustrates an example implementation of a jot mode. In this mode, the user has the ability to "edit" the contents of the card. The cue card "jot mode" changes the view to reveal a display where the media is shown along with the editable content. User can add "Tags" to the cue card, which acts as new ways for the user to classify an asset. These "Tags" can then be searched on or used to display cue cards in the users My Stack area. User can also add "Notes" and "My Links" to a cue card. "Tags", "Notes", "My Links" and "Comments" can be shared with the community of students. If student-A clicks on a cue card from students-B's stack student-A will be able to view the "Notes" and other information that student-B has entered for the card. Student-A can select to "edit" student-B's cue card "Comments". The changes will be entered to student-A's card. Student-B will be notified that student-A has added on to their Comments section. Student-B can then see what student-A has entered and elect to save the comment to their card as well. This chain will continue for all users who select a card from any user's personal stack. Any student in a chain of shared cue cards will be updated when a new comment is made anywhere in the chain that originated from his/her personal stack.

If Student-A clicks on a cue card from student-B's stack, student-A will also be able to "snag" a copy of student-B's personalized Cue Card by selecting the Snag button 129. The "Tags", "Notes", "Links", and "Comments" will be copied to Student-A's stack.

In some examples, the number of comments that can be made to a cue card will be capped, for example, at between 50 to 100 comments in a chain. Once the cap is reached then the discussion gets moved to the message boards as a new thread that's based on the cue card's ID number. All chain members would be notified of the discussion change, or only those members that have previously commented on the cue card may be notified. A link for the discussion thread will be added to the cue card after the discussion thread has been automatically created.

In some examples, the owner a cue card, i.e., the originator of the commentary and personalization of a cue card may be able to lock a cue card against either viewing or modification by other students by changing their profile settings to private. In yet other examples, the owner may be able to adjust how much modification can be made to a cue card, for example, by setting a Comments, My Notes, or Tags (user defined key words) limit on a cue card. Such limits may be imposed by the educational network system administrator as well or by the teachers as a default setting for cue cards associated with curricula the teachers have previously set forth.

In some examples, a cue card owner may be involved in a group or a series of groups with other students (such as a special class or a group of students in a class working on a particular project). In these examples, the Notes, Comments, and Tags from various members of the group who are separately accessing the cue card may be aggregated into a single group cue card.

When the student is finished editing the personalization data on the back of the cue card, user may select to save the cue card.

In addition to having cue cards stored in a My Stack page, students will be able to print cue cards, i.e., a screenshot of the media player content and the personalized data from the Tags, My Notes, and Comments fields.

Figure 8:
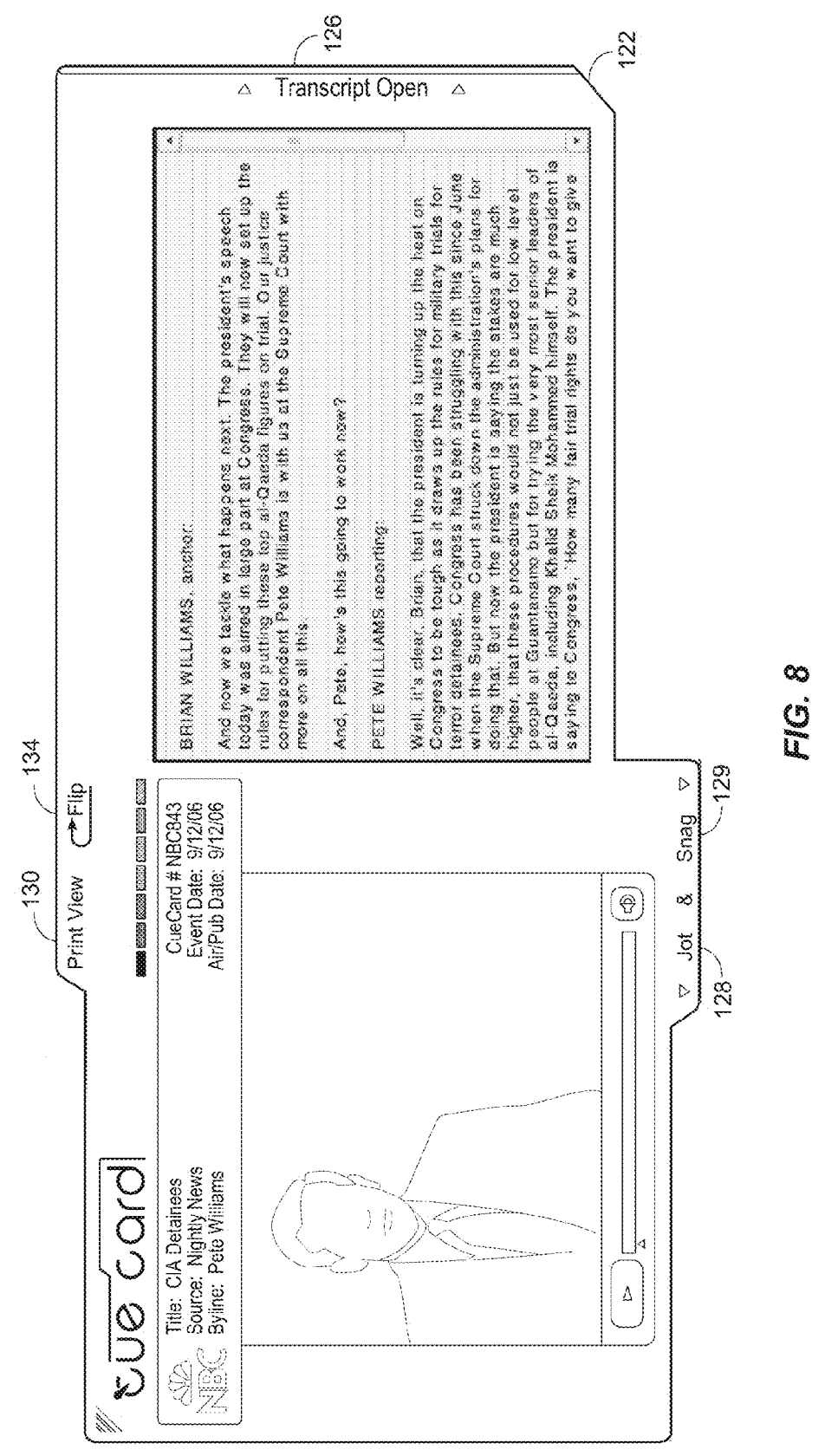

Each cue card also includes a transcript drawer that when activated by selection of button 126 will display a written transcript of the news content on display in the media player, an example of which is shown in FIG. 8. The transcript may be pulled from the original news source and stored in the cue card for viewing by the student and selection by the student in the event the student wants to use data from the transcript in further educational activities. The transcript may be stored in the cue card separate from the media asset such that a student can review the transcript independently from (i.e., in a non-synchronized manner) the news content on the media player.

Figure 9:
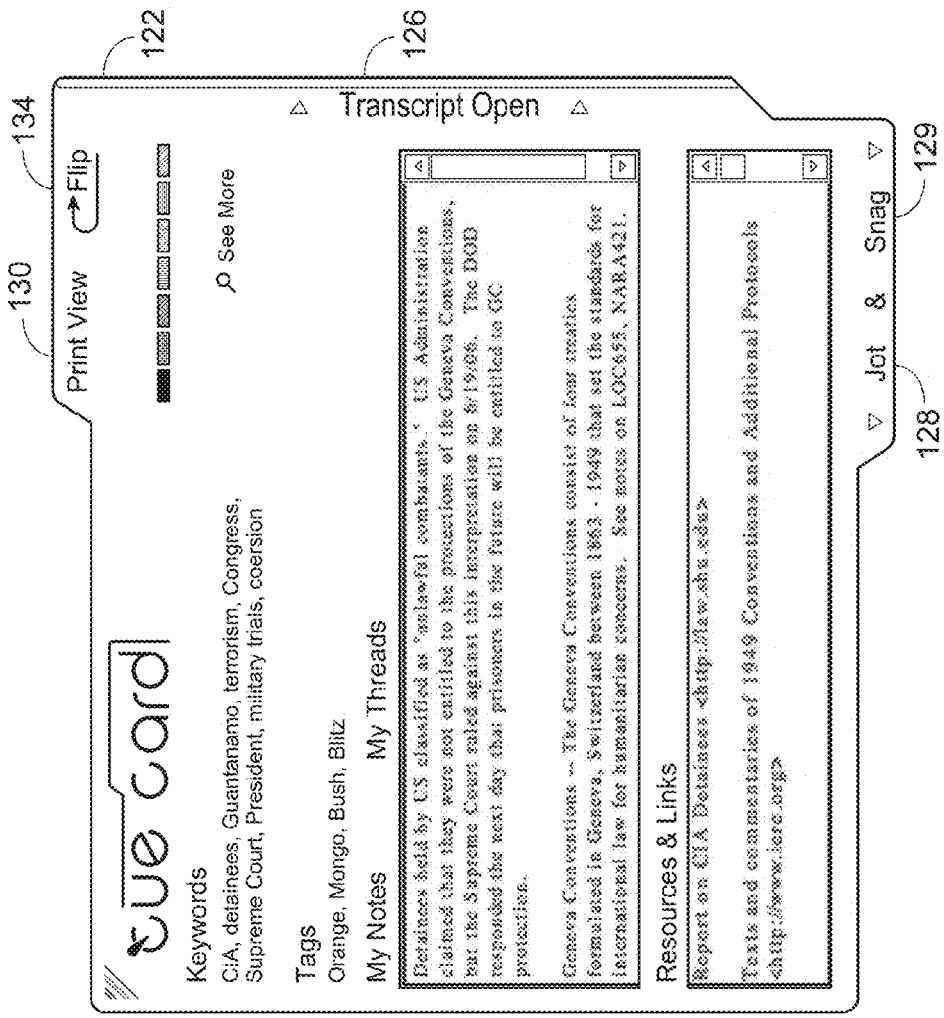
FIG. 9 illustrates a multi-sided cue card (or news element) generated by the education and archival news system, in particular showing a secondary side of the cue card.

As shown in FIG. 9, the back of the cue card may include fields for detailed bibliographic metadata under three main cateogories: General Information, Description, External Resources, and Editorial Keywords. General Information includes, for example, source, event date, copyright, and clip length. The data fields include an editorial Keywords field, where clicking on a keyword will take the student to a search results page showing all assets with that keyword defined, which assets may be sorted chronologically, by media type, more viewed or other characteristic. A Topics field may also be present and relates the cue card to a specific curricular area. Like with Keywords, if the user clicks on a topic in the topic they will be served a page with all assets related to that Topic. Default display will be chronological. Additional fields including the Resources & Links field, which links to outside resources and other asset types which supplement the cue card, links to My (discussion) Threads about news asset in the cue card and available to other students for access. The back or front of the cue card may be selected by selecting a flip button 134.

FIGS. 6-9 show a two-sided cue card having a first side which is a media view integrated with a transcript drawer for reading through text of associated news content and a jot mode drawer that allows a student to personalize the cue card for their stack and a second side which displays the bibliographic data. The system flips the cue card in response to the user selecting a flip button that appears on both sides of the cue card. There may be a sound effect simulating a flipped piece of paper. Pressing the flip button, the cue card rotates from front to back or back to front depending on the starting point to simulate the actual flipping of a physical playing card.

Instead of two sides, each cue card may have multiple sides, each associated with different content associated with news content on a primary side. In this way, each cue card—or cue cube or cue cone or cue pyramid or cue tetrahedron, etc,—may take on the look and feel of a three dimensional object on a computer screen. FIGS. 10A-10C show various examples of multi-sided (or multi-dimensional) cue cards. In this way, the cue card may be a multi-faceted news media element.

Three-dimensional cue card 200 in FIG. 10A includes a primary side 202 having a multi-media player 204 that is used to display the news content, media asset, selected by the student. This primary side may include the transcript drawer and jot drawer functionality as described above. A first secondary side 206 may include information such as a Keyword field, My Notes field, My Tags field, and a Resources & Links Field, as discussed above. A second secondary side 208 includes Reuter's, or other associated, news information related to that of the media asset on the primary side 202. The other secondary sides may contain other associated information that is also descriptive or related to the news content displaying on the primary side. Secondary sides, for example, may contain personalized information from other students, for example, when multiple students in a group view and comment on the same news content each student's comments may be accessed from a different side of the cue card. To accommodate each student, the cue card may increase in sides, adding a side (and correspondingly reshaping the existing sides) each time a new student comments on the cue card.

The secondary sides can contain information from other sources as well. For example, the EAN system—or content management system, more generally—may collect news content related to the original news content (media asset) displayed on the primary side and display that related news content in different sides of the multi-sided news element. For example, if a student has selected to view a particular news broadcast on a recent Supreme Court decision, a news element may be created showing a video of a news broadcast covering the decision. If that news content has been coded by keywords, then the EAN service may automatically search for news content containing the same keywords, which the EAN service will then populate into different secondary sides of the news element, adding additional secondary sides depending on the number of related news content items found. Keyword searching is just an example of how the EAN engine 100 and generator 118 may automatically populate the news element to include a plurality of secondary sides. The generator 118 may be programmed to form news elements with sides associated with particular content providers. For example, the primary side of the news element may be programmed to pull initial news content from a database of NBC news content, while different secondary sides will be associated with Reuters (side 208), THE ASSOCIATED PRESS, the THE NEW YORK TIMES, and THE WALL STREET JOURNAL, respectively. In some instances, a particular secondary side may have limited accessibility, such that certain students will not be able to access the news content for that secondary side. The side may be partially darkened or include a symbol or message identifying the secondary side and flagging to the student why the secondary side is not available.

Certain secondary sides for example may be associated with subscriber based external news services (databases) such that students who do not have a subscription to the external news service will not be able to view the news content originating therefrom. Teachers may be able to set which of the secondary sides are accessible to students and which ones are not by adjusting the settings for the cue cards/news elements. In this way, teachers will be able to control which news content is available to students through the educational news service. Such control may be particularly useful in educational environments were teachers would like the students to perform tasks, answer questions, etc. without the benefit of the full database of news information available to the students.

Of course, whether a student may access a secondary side or not may be changed at any time by a teacher or system administrator as desired. In some examples, secondary sides may be initially set to be inaccessible and then change to accessible at programmed times. For example, in a competition or game type learning environment where students are to solve or answer certain questions in a timed manner (with faster answers garnering a high score), then the secondary sides of an associated archival news or content element may be considered as offering clues to the student, such that not all clues will initially be accessible to the student. Some students will be able to use the news element to sufficiently answer the question or solve the problem in a first window of time, but for those students that cannot, as time passes additional sides of the news element will become available to the student offering additional clues as a result.

The students may interact with an archival news or content element using a mouse or keyboard or other input device to freely rotate the news element so that each of the secondary sides is accessible. To see the content of a particular side, the student may simply click on the side and the screen with zoom in on the selected side so that the selected information may be presented in a readily viewable format. Students will be able to freely rotate the news elements, through the GUI of the system.

FIG. 10A shows a six sided (or six facet) archival news or content information element (a multi-sided news element) having the primary side 202 and secondary sides (202, 206, and 208 being shown). FIG. 10B shows a six-sided news information element and a twelve-sided news information element each having a primary side 210 with the media player and multiple secondary sides 212. The news elements are not limited to a particular number of sides or facets. FIG. 10C shows other variations on the multi-sided news element that may be used as well, in fact each of these have sides made from corner cuts that would not contain content, as a primary or secondary side might, but rather further enhance visual appeal and the three-dimensional effect of the element. Furthermore any of the news elements having greater than 2 sides may still be displayed in a two-dimensional manner, as is a cue card, by having the cue card flip to different hidden sides of the news element each time a user presses the flip button.

Figure 11:
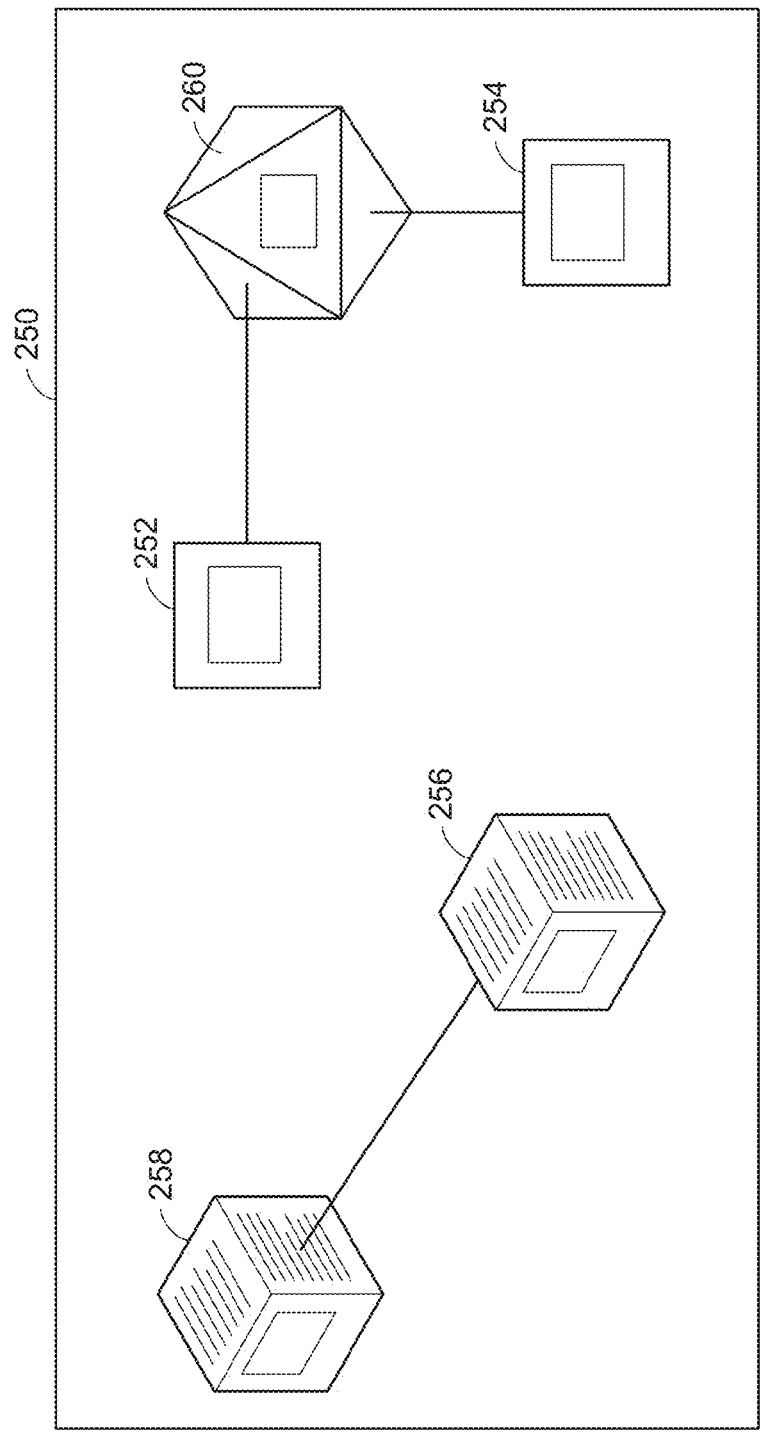
FIG. 11 illustrates a window containing multiple news elements that may be interacted with by the user.

FIG. 11 shows a news library window 250 in which numerous news elements 252-260, including some that are two side cue cards and others that are three-dimensional news elements, are shown to the student. Elements 258 and 256 have been interconnected by a user, as discussed more generally below. Two-dimensional elements 252 and 254 have been connected with the three-dimensional element 260, as well, where in the illustration, the element 254 has been connected with one secondary side of the element 260 while the element 252 has been connected with a different secondary side of the element 260. FIGS. 19-22 (discussed below) illustrate an example game the students may play using a display window such as that shown in FIG. 11.

The depiction of the multisided news elements described herein may be manipulated by a user. Cue cards may be flipped, as discussed above. In ADOBE FLASH-enable environments, three-dimensional news elements may be rotated in the simulated three-dimensional manner on a display screen. A system such as 170 (discussed below) may display the multi-sided news element in a window that allows a user to adjust the depiction of that news element so that different sides may be shown. A user may zoom in or zoom out on the news element to allow the user to see media content or associated information more clearly as well as to see zoom in or zoom out on the universe of news elements depicted, a particularly useful feature for implementations in which a user has interconnected numerous news elements. The computer system may manipulate a single interconnected news element, rotating that news element without affecting the position of the news elements interconnected thereto, and manipulate the entire group of interconnected news elements to affect the depiction of all.

Figure 12:
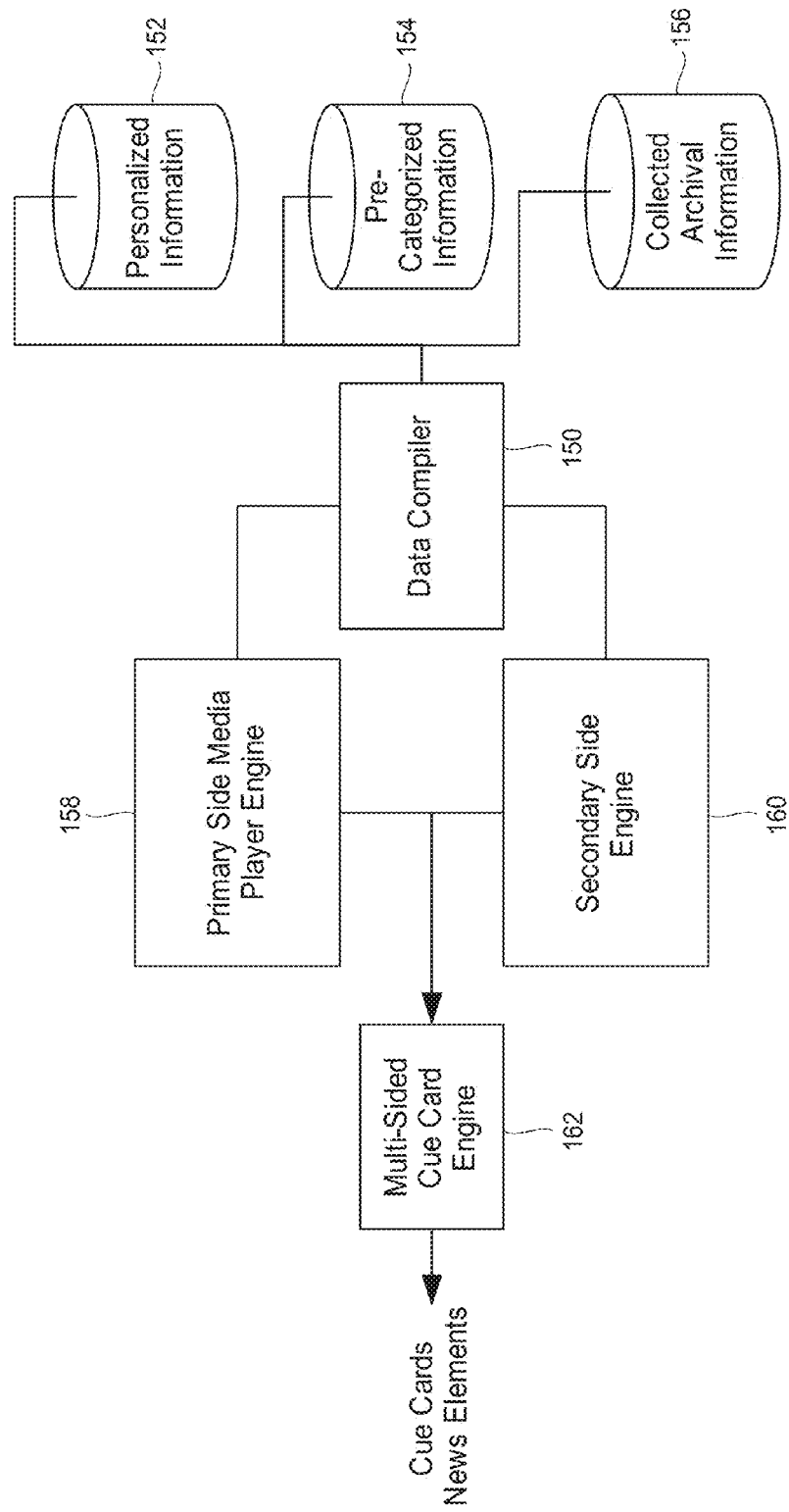
FIG. 12 illustrates a block diagram of a cue card (news element) generator that may be used to create the news elements of FIGS. 6-10, in accordance with an example implementation.

FIG. 12 illustrates an example implementation of the generator 118, where a data compiler 150 receives news information from various storage databases 152-156, where such information is associated with media content. The first data source 152 is from personalized information such as that entered by a student in the Comments, My Notes, and Tag sections discussed above. The personalized information may also include information such as other linked news elements or cue cards. The data source 154 includes pre-categorized information, which would include information that a content provider has pre-determined to be of relevance to a particular media asset to be displayed to the user. Content providers, for example, may encode archived news with keywords thereby automatically linking other archived news sharing the same keyword. The data source 156, in contrast, may result from the engine 100 polling content providers for relevant or potentially relevant additional news information after a user has selected an initial media asset. For example, the engine 100 may be programmed to analyze data for a media asset selected by a student and then search a content provider database 156 for archival information related to that media asset. In this way, the engine 100 may compile additional information related to static as well as dynamic data that may be updated on the media asset, dynamic data such as new Tags assigned to the cue card. The data compiler 150 parses the data from the sources 152-156 into data to be displayed in the media player or drawers of a primary side of a cue card or news element, from data to be displayed on a secondary side of that cue card or news element. Two engines 158 and 160, respectively, prepare the data from the compiler 150 and prepare pages that are provided to a multi-sided cue card generator 162 which creates the graphical display of the cue card/news element and allows the user to interact with the card/element, including to rotate the same (e.g., to manipulate the depiction of the news element to simulate three-dimensional movement) and to create connections extending from the same to other cards/elements. In a FLASH-enabled environment, AJAX (Asynchronous JAVASCRIPT and XML), JAVASCRIPT, PHP (PHP: Hypertext Preprocessor) and HTML (Hypertech Markup Language) elements may be used to allow for user input and customization and data retrieval. Flash and PHP in particular are amenable to creating rich web-enabled visual content.

Figure 13:
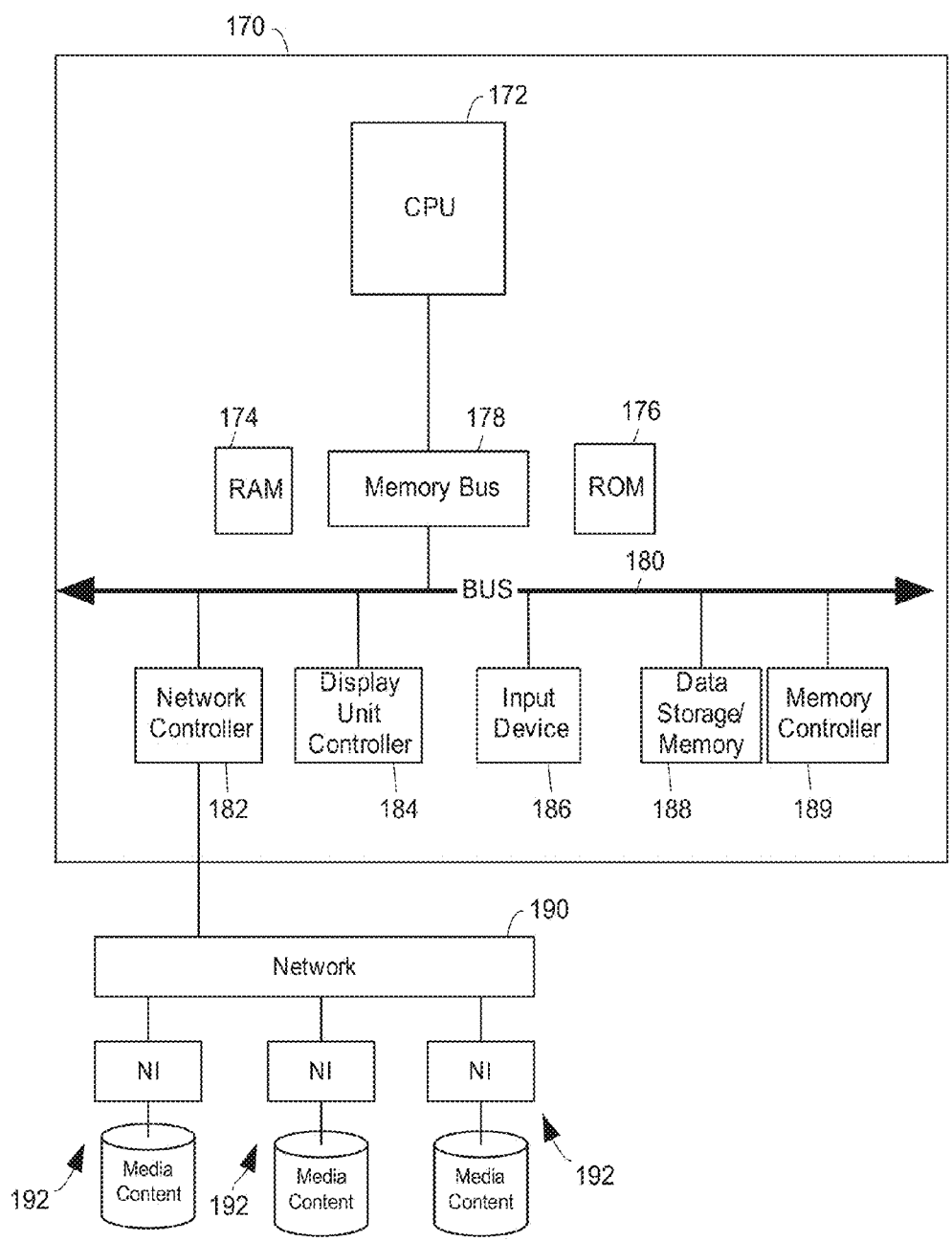
FIG. 13 illustrates a example computer system that may be used to implement the generator of FIG. 12.

In some examples, the system shown in FIGS. 1 and 2 may be implemented in a stand-alone computer system as is shown in FIG. 13, although in other examples, the various techniques described herein may be implemented in a distributed system or network of systems. FIG. 13 illustrates an example computer system 170 that includes a CPU unit 172 coupled to a RAM 174 and a read-only memory (ROM) 176, via a memory bus 178. These memory areas, or others, may store media content to be displayed to a user, for example, media content collected from internal or external archival news systems, where the processor 172 is able to identify the desire media content and control display of the same to a user. In the illustrated example, the memory bus 178 is coupled to a system bus 180, although alternatively the memory bus 178 may be a system bus. The illustrated configuration is by way of example only.

The CPU 172 may include a discrete arithmetic logic unit (ALU), registers, and control unit all connected together. Or, as shown, the CPU 172 may be an integrated microprocessor, with on an chip cache or caches (not shown). The system bus 180 is coupled to a network controller 182, a display unit controller 184, an input device controller 186, and a data storage or memory 188, e.g., a mass storage device. The computer system 170 may operate from any suitable operating system, including any one of the WINDOWS family of systems available from Microsoft Corporation of Redmond, Wash., such as WINDOWS. Alternatively, the operating system may be one of the UNIX* family of systems, originally developed by Bell Labs (now Lucent Technologies Inc./Bell Labs Innovations) of Murray Hill, N.J. and available from various sources. As a further alternative, the operating system may be an open-source system, such as the LINUX operating system. It will be recognized that still further alternative operating systems may be used.

The EAN system may be executed on the computer system 170, for example, with the engine 100 and media player and cue card generator 118 stored on a machine-accessible medium such as the memory 188 (which may alternatively be connected directly to the memory bus 178) or such as the RAM 174 or ROM 176. The CPU 172 acts as a central processing unit in communication with a number of machine-accessible medium which may include a volatile memory, a non-volatile memory, and non-volatile random access memory (NVRAM). The volatile memory may be implemented by SDRAM (Synchronous dynamic random access memory), DRAM (Dynamic random access memory), derivatives thereof or any other type of random access memory device. The non-volatile memory may be implemented by flash memory, option-ROMs, or any other desired type of memory device. In some examples, access to the memory may be controlled by a memory controller 189. Other types of memories include a motherboard flash memory. Yet, other types of memories include optical storage media (CD-ROMs and DVD-ROMs), hard drives, optical drives, and disk storage media, for example coupled to the machine through a memory controller 189. The machine-accessible medium with machine-readable instructions contained thereon may be used to cause the machine to perform the aspects of an education and archival news system as discussed herein.

The network controller 182 connects the computer system 170 to an external network 190, for example, via the internet or World Wide Web. In the illustrated example, various external systems 192 are connected to the network 190 and made accessible to the computer system 172. For example purposes, each system 192 is shown to have a network interface system (e.g., a network interface card and controller) which is coupled to a media content database and allows the computer system 170 to communicate with each system 192 to request access to and receive downloads of archival news from these media content databases. Of course, while the media content databases are shown external to the computer system 120, they may be stored in the memory 188 or RAM 174 internal to the computer system. Furthermore, any of these media control databases 192 will be understood to include or by replaceable with a news information database for accessing information associated with a media asset.

FIGS. 14-25 relate to an example implementation of an EAN system in the form of a web-based application termed the iCue system. The illustrations are provided for explanation and example purposes and not by way of limitation. The illustrated iCue functionality provides merely example implementations of an educational and archival news system generally described herein and claimed below.

Figure 14:
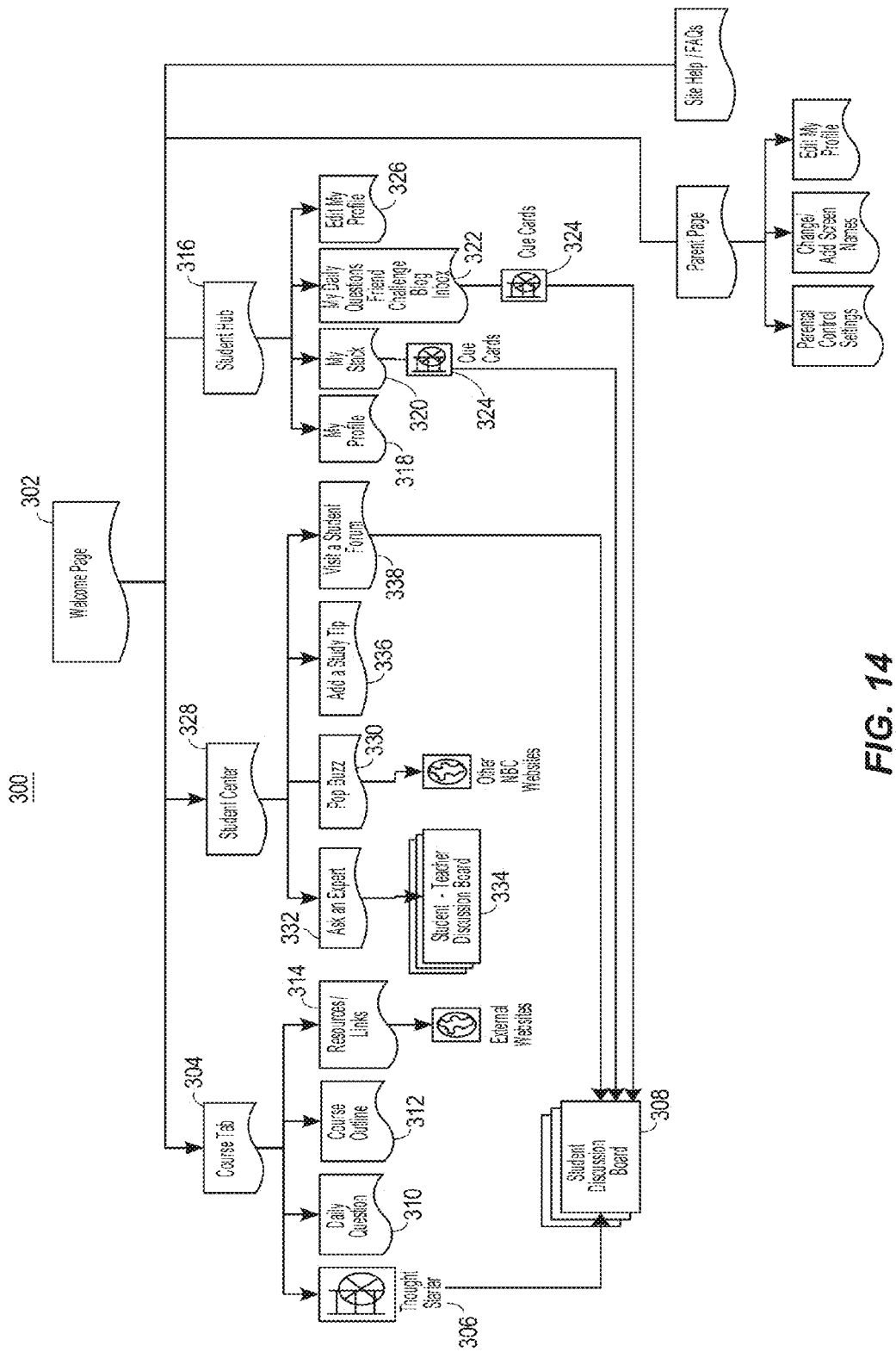
FIG. 14 illustrates a hierarchal diagram of web-pages for an education and archival news system in an example implementation.

FIG. 14 shows a tree diagram 300 of an example Welcome (or Home) Page 302 presented by the GUI 114 in an example iCue system. The welcome page 302 is the first page that students will see when they successfully log in using a valid username and password. It is their window to the iCue community and may include teasers of dynamic content, scoring and daily questions under each course. Students can click on links in the navigation menu across the top of the screen, hyperlinked images and/or text to access the different sections within iCue.

The Welcome Page 302 may be updated every day by the iCue production team and technical engine 100 through pulling content from the content providers 108-112, teachers, and any sources allowed by the administrator 106.

On the home page, under a course or other tab 304, a thought starter topic 306 may be displayed, for example associated with media asset or cue card. There may also be a discuss button displayed next to the thought starter. When a student clicks on the media asset, the media player will be launched to play the media asset/video, such as shown in FIG. 6. A 'Discuss' button on the Welcome Page will have a link to a discussion board 308 in the Student Center tied to that asset. If the student clicks the Discussion Board link, he/she will be directed to the ongoing discussion for that content. The student will be able to post a new message on the discussion board and view all messages posted by other students, or start a new discussion thread.

There may also be a 'Cued Up' asset of the day 310 (historical media asset/Cue Card) on the Home page for each Course, which is a featured asset with accompanying text. This is a separate element from the 'Thought Starter.' There will also be a link to the Discussion board for this asset. A course outline 312 and Resources link access button 314 may also be provided in the course tab 304 of the welcome page 302.

Figure 15:
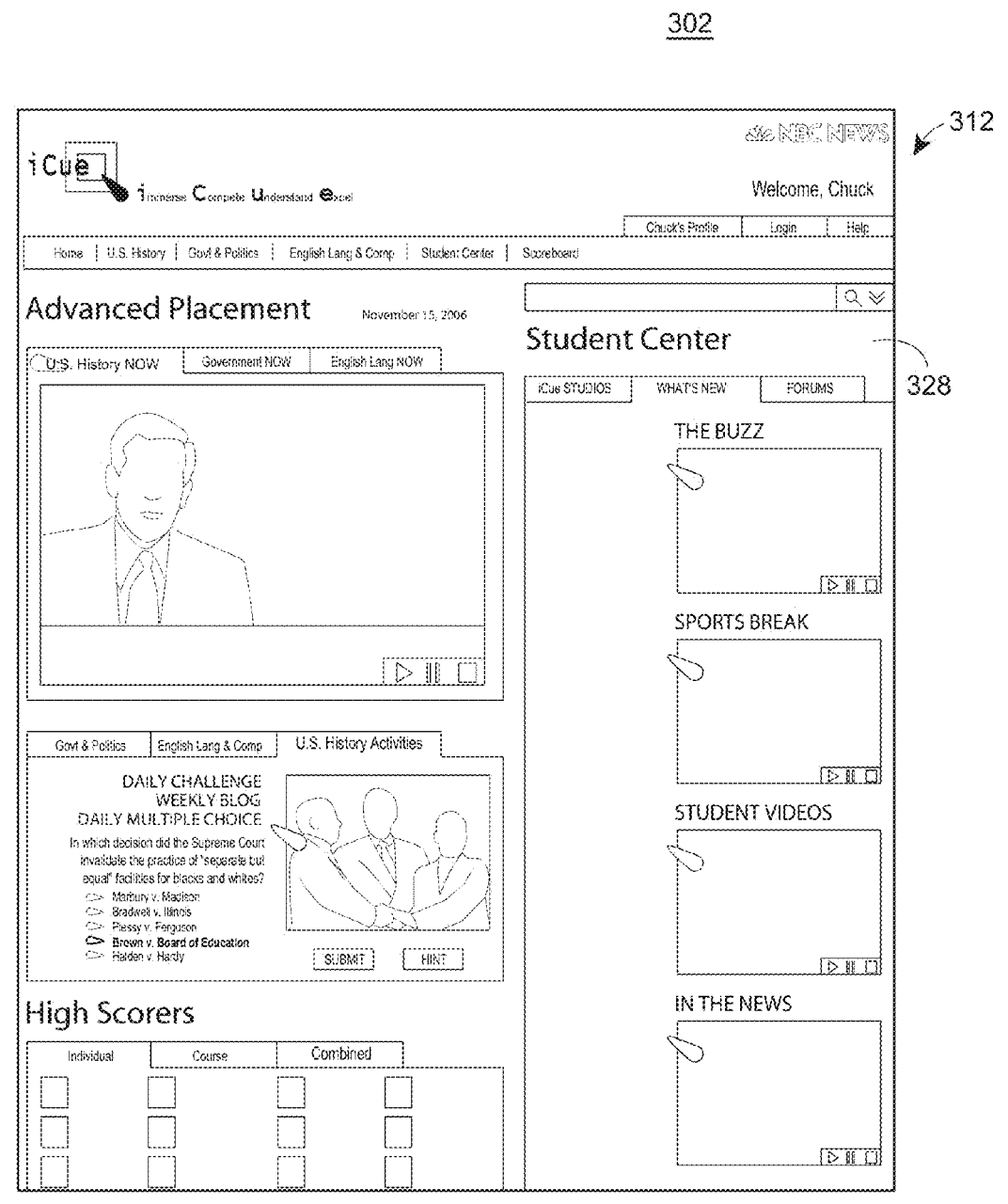

FIG. 15 illustrates a sample Welcoming Page 302 for a student or parent. The welcoming page has navigation bar across the top of the screen will include links according to user. For a Student/Parent the following links may be provided: Home (Welcome Page); My Profile; Individual Course pages; Student Center; iCue Scoreboard; Site Help/FAQ; and Logout. For a teacher the following links may be provided: Home (Welcome Page); My Profile; Individual Course pages; Student Center; Teachers' Lounge; iCue Scoreboard; Site Help/FAQ; and Logout.

The Student Profile 316 of the welcoming page 302 is the student's own dashboard within the iCue version of an EAN system and provides a single location that stores and displays each student's profile information 318 and enables him or her to manage his or her cue card stack 320. The Student Hub 316 will provide a dashboard view for each student's pending/new coursework and a history of challenges/games played, daily questions answered, and blogs submitted. Students will be able to directly access previously submitted questions, games and blogs to build on what they have already done. Students will also be able to access new questions, games and blogs that have not yet been submitted. This page is visible to the registered student and the registered parent (read only access).

The My Profile page 318 may include the student's registered screen name and buddy icon (optional) will be displayed on this page, a unique student identifier such as the screen name, a buddy icon for other students, and any identifications for integrated educational databases such as a FACEBOOK ID. The My Profile page 318 may include a student's score in the educational news service environment. Scores may be displayed under two categories: Points—total points scored are based on the points accumulated for each completed activity (Daily Game Challenges, Weekly Blogs, etc.); and Ratings—An average of the student's blog ratings (by teacher and 5 anonymous peers) will be displayed. Other data to be displayed may be team information, for students involved in team-based educational programs, and textbooks, and existing cue cards. A student may be able to organize/manage all the assets they've collected under 'My Stack'. A student can group assets according to iCue-assigned Keyword/Topics or by student-assigned Tags. A 'Recently Viewed' bucket may display all the media assets that have not been organized yet. Student can delete an asset from 'My Stack.' Cue cards 324 such as those discussed above may also be organized as part of a user's FACEBOOK application page.

Daily questions, daily challenges, blog challenges, friends' listings, and an electronic messages inbox may also be listed at page 322. The friends listing may differ from the buddy list, in that the latter is associated directly with the educational news system, while the former may be from an external electronic database such as FACEBOOK. That is, students can maintain a list of friends in the iCue network. They can also gain access to their FACEBOOK network of Friends through the FACEBOOK application. Students can view a complete list of all their friends in the iCue network. The list will display screen names of the friends. Students can click on any friend's screen name in the list to view the friend's external profile page. Within the FACEBOOK iCue application, users can also see their FACEBOOK friends who also use the iCue application. Students may be able to add or delete friends as desired and in some instances have this data synchronized with the external electronic database for display on that databases access portal, web address, etc.

Students can send invitations to other iCue users to be their friends. Student will be required to use the 'Search and Select' window to look up other iCue students, and select the names that he/she wants to send an invitation to be a friend. Students can type their own message or use the default invitation message provided by iCue while sending the invitation.

Students using the FACEBOOK iCue application may be able to invite Friends to join them there. All registered students will be able to send a message to other friends outside the iCue network. When a user adds the iCue application within FACEBOOK, a notice will be posted in their news feed. Students will also be able to edit their profiles as desired. An edit profile tab 326 may also be shown.

FIG. 14 also shows a Student Center tab 328 that may be used for Social Networking/Community tools. The Student Center section 328 of the website is a dynamic, socially-driven aspect of the site, enabling the iCue community to exchange ideas outside of the coursework games and blog spaces and building bridges to the other social networking sites where they may also be active participants. Much of this content will filter back to the FACEBOOK version of the iCue application.

There should be automatic content filtering tools for a discussion board, blog, and any user-generated content. iCue Administrators and administrators should have the ability to add additional filters.

Students will have sections that allow the iCue educational news service to push content from the news database such as popular culture news. For example a Pop Buzz section 330 of the presentation may provide a look at the latest events and trends in pop culture and relevant links to stories on other NBC sites. This content will be updated on a daily basis by EAN administrators (iCue administrators in this example) 106 and through the EAN engine 100. This content may include pop culture news, links to stories on other NBC (or other external content provider) network sites, links to content partner sites, links to discussion threads in the student center forums.

Yet other sections will connect students to teachers for an ask the expert forum 332. Students will be able to ask for help by sending a message to a Subject Matter Expert (education consultant hired by NBC). This will direct the student to a student-teacher discussion board 334 where the student can start a new thread to ask a question. Education Consultants from iCue will respond to the question posted by the student. Other iCue students will also be allowed to participate in the discussion.

Through a Study Tip section 336, students and teachers will be able to post study tips, ideas and learning strategies to help each other in their preparation for the AP exams. This will direct the student and/or teacher to a Study Tips Discussion Board. All users will be allowed to participate Through a Visit a Student Forum section 338, students can start a new thread in the discussion boards or forums 308 to express their ideas, views, and to share information that is related to their coursework for AP exams. Under a different header, students can start/contribute to a thread about non-AP topics. Students can post replies to ongoing discussions or simply view other students' entries. The Forum 308 can include multiple discussion threads. Students can start a new discussion thread or post a new message to an existing thread at various points within iCue (to discuss Cue Cards, Thought Starters, Daily Questions or any topic in the Course Outline). Each thread will be indicated with a new line in the interface that includes the number of posts, topic of discussion, screen name of the member who started the thread, and when the last post was made.

A separate module accessible from the Welcome Page (FIG. 15) will be iCue Studio, through which students will be allowed to publish their videos (user generated) online and share them with their friends within the iCue network. Uploaded images will be subject to review by iCue administrators before they are allowed to be posted. The image will appear privately to the student, but not to any external users until images are approved.

Figure 16:
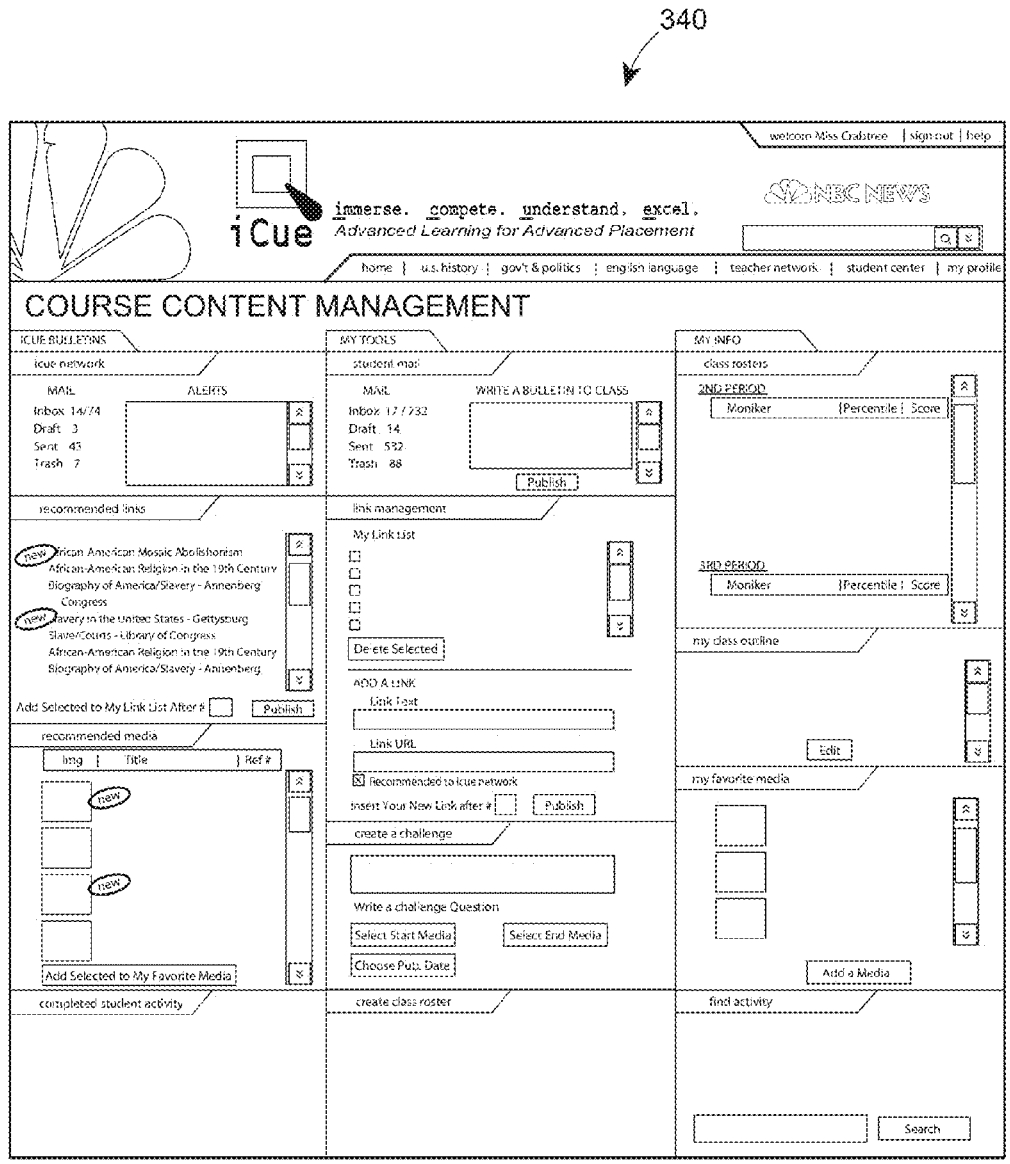
FIG. 16 illustrates another web-page in accordance with the example of FIG. 14.

A teacher class hub or course content management 340 is shown in FIG. 16. Course management hub 340 serves as a 'desktop' for registered iCue teachers, providing a location that stores the teacher's class details, course outlines and activities associated with each class. The teacher will use the hub 340 to plan and manage the class activities, create class activities, rate students' performance and monitor the students' progress over time. The teacher will be able to directly access new submissions that have not yet been rated.

Teacher iCue Bulletins—Teachers can view a list of media (Cue Cards available in iCue) recommended by iCue administrators that may be relevant for his/her class. Teachers can view a list of external links recommended by iCue administrators that he/she can use in his/her class.

Create and View a Class Roster—Teachers will be able create a class and add students to his/her class. Students must be registered in iCue in order to be added to a teacher's class. This section will generate a 'search and select' window, for the teacher to look up students by first name, last name, school and/or registered iCue name. The selected students will be displayed on the hub Page 340. Teachers will be able to create multiple teams within a class and assign members to teams to facilitate collaborative projects and encourage interaction among students. Teachers will be able to search and select teams that will be displayed on the Classroom Page.

Teachers will be able to write a new bulletin and publish it to the Classroom page. Teachers will be able to maintain and manage a list of his/her favorite links to external websites on the Internet. Teacher will be able to recommend their favorite links to the iCue administrators.

Create a Challenge—Teachers can create a new challenge question for the class, in addition to the challenges and questions published by the iCue administrators. The new challenge can be a Timeline, Concentration or Connections game and will be published on the Classroom page on the date specified by the teacher. Teachers can 'search and select' a Cue Card within the iCue database to accompany the challenge. Teachers can create multiple challenges and schedule different publish dates for each of them.

Find an Activity—Teachers can search for archived activities that can be published on the Classroom page via a 'Find An Activity' space, which includes links to a course-specific Activity Archive Page: Multiple Choice Archive Page; Daily Challenges Archives; Timeline Archive Page; Concentration Archive Page; Connections Archive Page; Weekly Blog Archive Page; and Teachers can 'search and select' for activities via an advanced search engine.

Publish a Completed Student Activity—Teachers can select a Weekly Blog or a Daily Challenge (Timeline, Concentration, Connections) completed by one of his/her students and publish it to the Classroom Page as a link to that student's External Profile Page. Teachers will be able to create new threaded discussion boards/forums to engage the students to express their ideas, views, and to share information on topics related to their coursework for AP exams.

My Info—Teachers can maintain a list of their favorite iCue media (Cue Cards). Teachers can add tags (additional keywords) and categorize them as required, for future use. These assets can be published to the Classroom page as 'Favorite Media'.

My Class Outline—Teachers can re-order the course outline based on the standard AP course syllabi provided the College Board for display on the Classroom Page. Edit my Profile Teachers can edit their own profile information that is visible to the students and parents on the Classroom page.

Teacher profile hub 340 is the teacher's own dashboard within iCue, providing a single location that stores the teacher's Friends List, Mailbox, communications between teacher and iCue producer, communications between teacher and students in his/her class, communications between teacher and other iCue users/friends, and profile information. This page may be only visible to the registered teacher.

Teachers can maintain a list of friends in the iCue network. Teachers can view a complete list of all their friends in the iCue network. The list will display screen names of the friends. Teachers can click on any friend's screen name in the list to view the friend's external profile page. Teachers can delete other teachers from their list of friends. Teachers can send invitations to other iCue Teachers to be their friends. Teachers may use the 'Search and Select' window to look up other iCue teachers, and select the names that he/she wants to send an invitation to be a friend. Teachers can type their own message or use the default invitation message provided by iCue while sending the invitation. All registered teachers will be able to send a message to other friends outside the iCue network.

Mailboxes—Teachers can access his/her iCue mailbox on this page, managing communication within three groups (iCue Administrators, Students in his/her class and Teachers/Friends).

Figure 17:
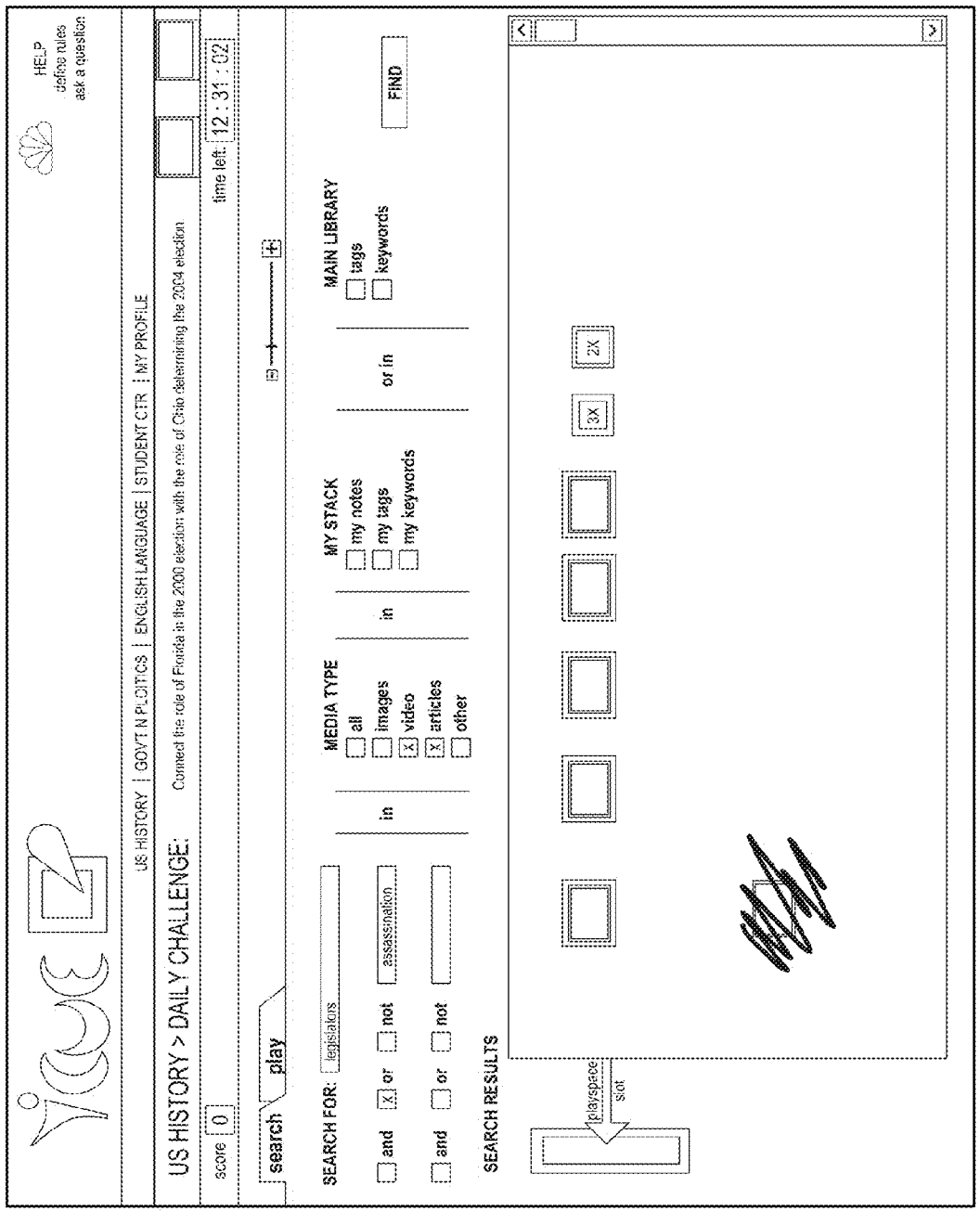
FIG. 17 illustrates an example search page for the education and archival news system of FIG. 14.

FIG. 17 shows an example search page that may be presented to a student. From the search results, the educational news service would collect cue cards/news elements to present to the student. The advanced search page will allow users to search for content across the iCue website. The Advanced Search link will be displayed under the Search Box on the top navigation menu on every screen. Users will be able to combine keywords, topics, and search criteria to search for information on the website. Users will be able to search for exact phrases and use Boolean operators like OR or AND as well as wildcards to search for results. Users can narrow down their search by limiting the search to any one of the following: Media Type (images, video, articles, all or other); My Stack (search within cue cards in their stack); Main Library (search all assets in the iCue library); and Discussion Boards (search discussion boards only).

Figure 18:
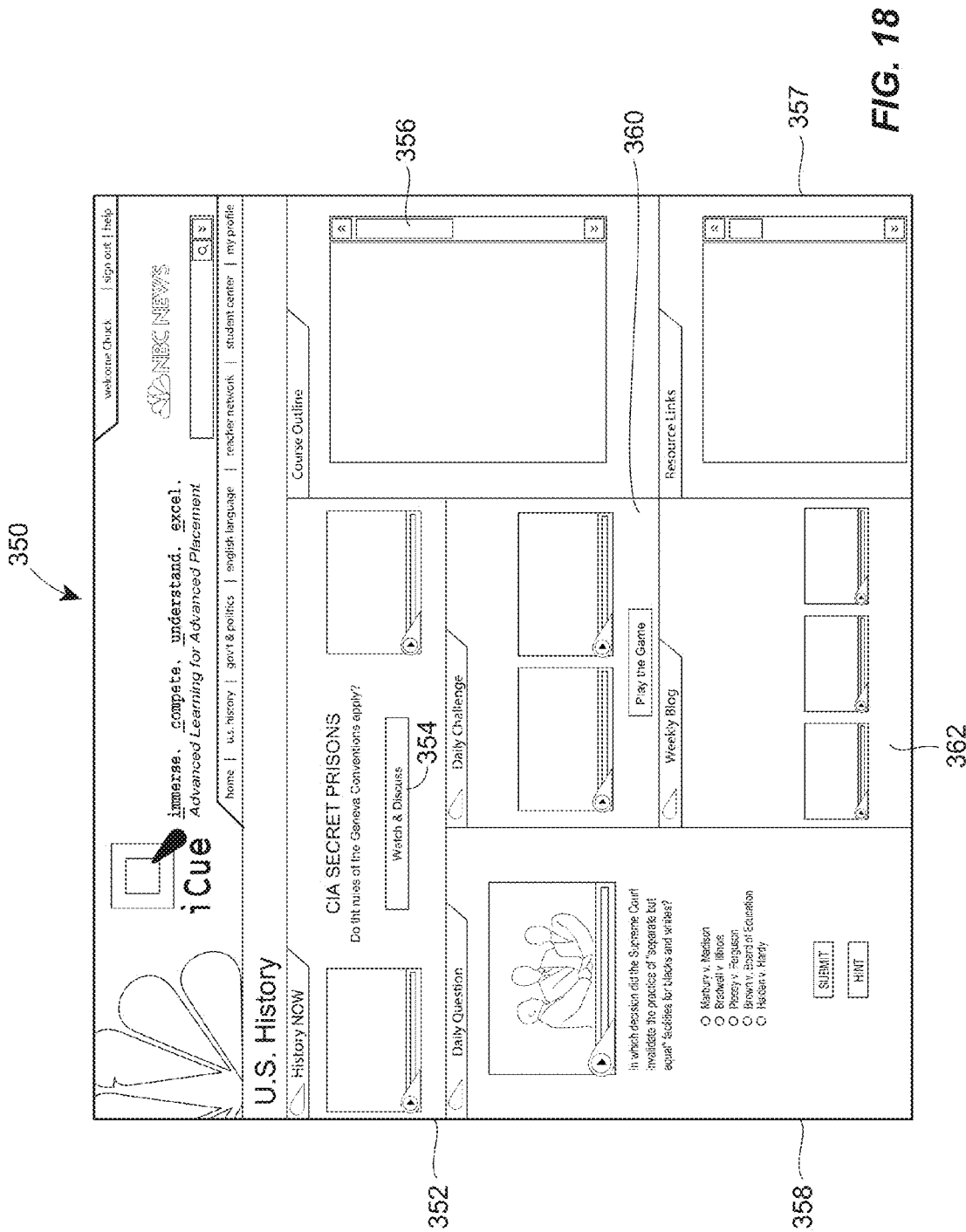
FIG. 18 illustrates another web-page in accordance with the example of FIG. 14.

The educational and archival news system coordinates coursework, news content, and student interfaces, as described above. From the student hub, students will be able to access a Course Page 350 as shown in FIG. 18.

This section on the Course Page 350 displays a new thought starter 352 each day (media asset selected by the iCue Administrator). The thought starter media asset could be a video or an image. The student must click on the asset to play the video or view the image. A Watch and Discuss button 354 will be displayed next to each thought starter. When a student clicks on the thought starter media asset, the video player will be launched to play the media asset/video. When a student clicks on the Discuss button 354 on the Course Page 350, he/she is directed to a new page in the Student Center forums where a discussion thread has been created about that asset. The student will be able to view messages posted by other students and also post a new message on the discussion board. The topic headline for a discussion thread will be entered by iCue Administrators. Link to Thought Starter Archive Page The Course Page 350 displays a new 'Cued Up' media asset each day (a media asset selected by the iCue Administrator). The Cued Up media asset could be a video or an image. The student must click on the asset to play the video or view the image. When a student clicks on the Cued Up media asset, the video player will be launched to play the media asset/video. When a student clicks on the 'Discuss' button, he/she is directed to a new page in the Student Center forums where a discussion thread has been created about that asset. The student will be able to view messages posted by other students and also post a new message on the discussion board. The topic headline for a discussion thread will be entered by iCue Administrators.

Course outlines 356 will be published based on materials licensed from The College Board and other sources so students can have ready access to the topics and themes on which they will be tested. The syllabi will also provide an easy access gateway to video assets associated with specific topics so they can browse and review archival material as it relates directly to the syllabi. While not a curriculum, this will allow students and teachers to see how material within the site directly relates to AP subject requirements.

iCue Administrators will provide/suggest a list of resource relevant links 337 to the students, based on the standard College Board course outline.

When a student clicks on a topic in the course outline, the associated resources/links tied to that topic will be displayed in the resources/links frame 357. All associated iCue cue cards tied to the selected topic get displayed in the left frame. Links in the Resources frame are links to external websites and the list is sorted alphabetically.

A new Daily Question (multiple choice) 358 provided by the iCue Administrators appears on the Course page 350 each day, allowing students to explore a wide variety of sample multiple choice questions as they prepare for the Advanced Placement (AP) exam. On a daily basis, these questions condition the students to think about issues in a format and structure that is typical to AP exam testing. This portion of the page also includes link to multiple choice archive page The daily multiple-choice section presents one question on the screen with a list of five possible answers under the question. The student can proceed in any one of the following ways:

1. Select an answer and click Submit to submit it as the final answer.
2. Click on any one of the five options and view the media asset associated with that answer. The associated asset/cue card gets displayed in a pop up window.
3. Click the Hint button to play any one of the five possible answers in the list. The system will randomly select and play the associated media asset for any one of the five possible answers.

Next, the student can either select the viewed asset as the final answer and click Submit or click on any other possible answer and view the media asset associated with it.

Scoring may be achieved as follows. A student scores 5 points (maximum) if he/she selects and submits the correct answer in the first attempt. Every time a student views an asset (either by clicking the Hint button or by clicking a possible answer), the asset gets added to his/her 'My Stack/Cue Cards'. The student can continue to click on the Hint button and view the randomly selected media assets associated with the possible answers. Every wrong answer the student submits reduces the number of points that can be scored (after the first wrong answer, he/she can only score 4 points, then 3 points, etc.) A student will score at least 1 point when he/she attempts to find the correct answer for the daily question.

When a student selects an answer and clicks Submit, he/she is directed to a results/answer page. The Results page may include a confirmation message indicating if the selected choice is the correct or incorrect answer. If the submitted answer is incorrect, the results page will display: thumbnail image associated with the asset; all remaining possible options for the correct answer; hint button and submit button under the list of possible choices—for the student to pick another answer; the results page will show that the cue card associated with submitted (incorrect) answer has been added to the students 'My Stack'. Every time the student selects an answer and clicks Submit, the cue card associated with that answer gets added to his/her Stack. Eventually, all 5 cue cards associated with the multiple choice options in a daily question will be displayed on the Results Page. The cue card associated with the correct answer will be highlighted The iCue educational and archival news service may provide numerous different types of games to students. One type of game involves the multi-sided cue cards or news elements described above in reference to FIGS. 6-10. The objective of the game is to provide daily game challenges 360 from the iCue administrators and displayed on the Course page 350 each day. The "game mechanics" consist primarily of students making connections among of a variety of media assets to support their understanding of syllabus-specific topics and subjects. Scores are tallied according to rule-based, keyword- and topics-defined linkages in the "game engine."

The daily challenges 360 are aligned along three different, yet complementary play patterns: (1) Timelines—Players order and connect cue cards/news elements chronologically only, (2) Concentration—Players flip and match cue cards/news elements by keyword, and (3) Connections—Players link multiple cue cards/news elements to connect reported events.

Within each of these three play patterns, the EAN engine 100 will create three different levels with increasing degrees of difficulty as student's progress through each. Completing one level is not a condition of advancing to the next level; rather, levels are intended to help "scaffold" students and engage them at levels where they feel comfortable and competent, yet appropriately challenged. On any given day, there may be nine (9) game options to engage students and fuel competition within each Course, as provided in the table below.

|  | Level 1 | Level 2 | Level 3 |
| --- | --- | --- | --- |
| Timeline (Publication/Broadcast and Event Dates Masked) | Place one cue card in relation to two/three others | Place four-five cue cards in relation to two/three others | Order as many cue cards as possible within a single keyword category |
| Concentration (Keywords Masked) | Match six pairs of Cue cards among a palette of 12 cards | Match 12 pairs of Cue Cards among a palette of 24 cards | Match cards in pairs or triplets from among a palette of 36 cards |
| Connections (Nothing Masked; All Notes and Information | Connect two "polar" Cue cards through links with a limited | Connect two "polar" Cue cards through links with an | Connect multiple Daily Challenges through links with |

|  | Level 1 | Level 2 | Level 3 |
|---|---|---|---|
| Visible) | number (~10) of pre-designated Cue cards | unspecified number and undesignated Cue cards | an unspecified number/undefined Cue cards |

The general goal is for students to develop an understanding of the relationships among People, Places, Things, and Ideas across time in each of the three courses. With each level of increasing complexity, players are eligible for bonus points through a variety of "surprise" elements that emerge during game play. Generally, students may play all three games and levels within the same "play space," using the same tools and search features, but with minor adjustments or graphic tweaks to indicate different play and goals. A game screen is broken into three major regions, top to bottom:

(1) Top: Challenge Description, Connection Tools, and Scoring, (2) Middle: Play Palette (Cue Card "LightBoard"), and (3) Bottom: Cue Card Stack Management and Search Bin.

A scoreboards page may display a complete listing of total scores (individual and teams) of all iCue registered students. Leaders will be determined both by actual score performance through game and daily question performance plus ratings earned by peer and teacher/expert reviews of blogs.

The game challenges provided by the iCue administrators are displayed on the Course page 350 each day. The "game mechanics" consist primarily of students making connection among a variety of media assets to support their understanding of a syllabus-specific topic or subject. Scores are tallied according to rule-based, keyword- and topics-defined linkages in the "game engine.

Figure 19:
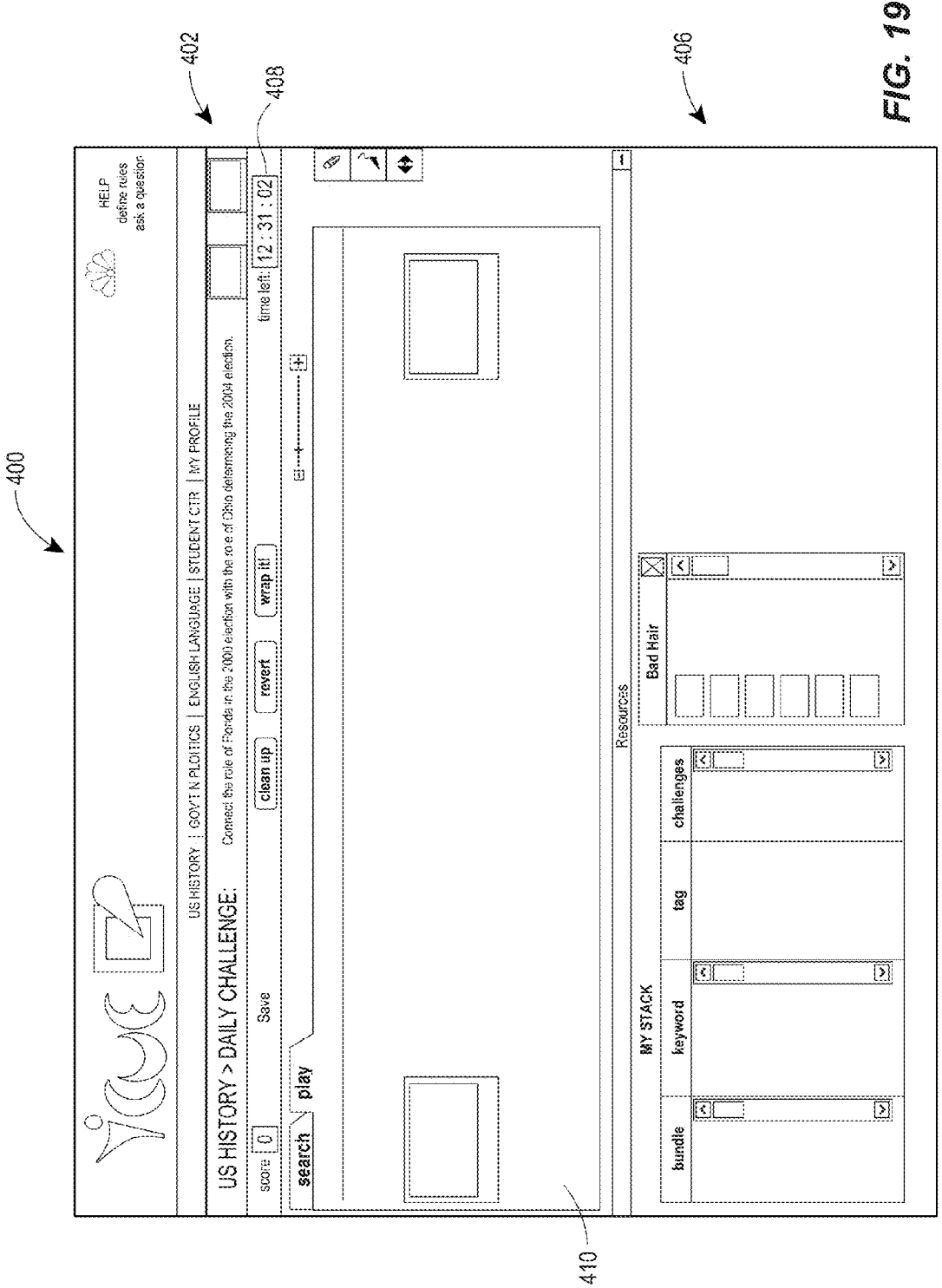
Figure 20:
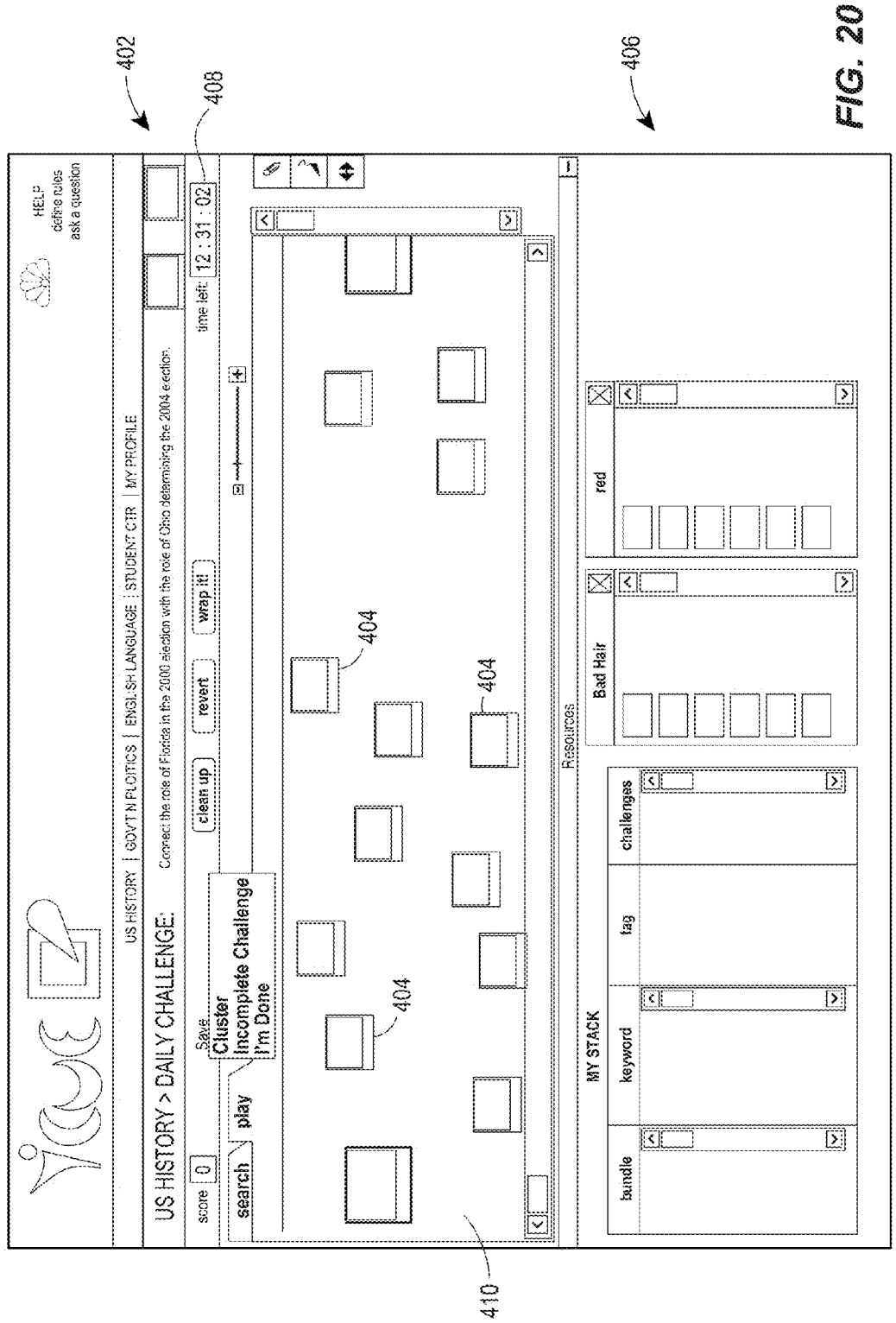

The Connection Game is described in relation to FIGS. 19-22, which depict screen shots that may be presented to students via the GUI engine 114. A challenge question and associated media assets ("polar" assets or thought starters) are presented on the Course Page each day. The game begins when the student clicks the 'Play the Game' button. The challenge question is displayed across the top on a game screen 400. FIG. 19 illustrates a challenge question to connect the role of Florida in the 2000 election with the role of Ohio determining the 2004 election. A toolbar 402 is visible. Thumbnails of polar assets 404 (only some of which are labeled with reference numerals) are displayed on the screen as shown in FIG. 20. The polar assets 404 are cue cards or other multi-sided news elements generated through the generator 118 under control of the EAN engine 100 and depicted to the user. A Resources Panel 406 is displayed at the bottom of the screen. All items under "My Stack" are clickable. A timer 408 is displayed on the top right corner of the play area. It indicates the time in hours—minutes—seconds format until the challenge is due for submission.

The player clicks on media assets to play them and drags the relevant assets on to play area 410. Options (buttons) in the Toolbar displayed across the top of the play area:

a. Cleanup—arranges the board orthogonally and/or pops a cluster into a 3d blob. It also causes the bonds to reveal themselves between assets that have been connected with the pencil tool and it tallies the score b. Revert—resets the board's layout to its previous configuration when the 'Revert' button was previously clicked.

c. Wrap it—finishes the challenge game and finalizes the scoring, tallying, and causes the game to be archived. "Wrap it!" is the same as hitting "I'm done" in the save menu As shown in FIG. 20, there may be a Save menu to save clusters or incomplete challenges, as well as to allow the student to indicate when the student a completed play.

During play, the player may be required to draw lines connecting assets in the play area. By clicking on a cue card or news element the media asset expands to allow the user to view the secondary sides of the cue card or news element, as these secondary sides may contain additional information that the student may use to draw connections between media assets. See, e.g., FIG. 21.

When the player clicks the "Cleanup" button, if there is a connection between the assets, color-coded lines appear to signify a person, place, idea or thing type of linkage. The assets that are connected pop into 90-degree alignment and become evenly spaced, as shown in FIG. 22. In addition, the entire board is scaled to fit in the viewable area. Assets that were incorrectly connected by a player drop to the bottom of the play space area. If an asset drops out this may cause connected assets in the middle of the board to form an islands, that is clusters of assets not connected to a polar asset.

The player may click the Search tab (FIG. 17) to perform a search on a topic by searching the tags and keywords. Search results are displayed on the same screen under the Search Results section. Assets may be highlighted by certain rectangular colors or patterns to signify different statuses for the underlying asset. An asset displayed with a green rectangle, for example, may indicate that the asset has been viewed by the player and can be used in the play space. An asset displayed with an orange rectangle may indicate that the asset has not been viewed by the player and must be viewed before it can be used in the play space. Assets with a 2× and 3× stickers can randomly appear mixed in with the search results, where iCue administrators assign these stickers. The stickers are "randomizers" that allow the user to play a 2× or 3× point gain on a solution they are playing at that particular moment.

FIGS. 19-22 illustrate an example game in which students are encouraged to draw mental connections between media assets pulled from content providers by the EAN engine 100. In the above described implementation, predetermined interconnections have already been made between media assets, for example, by content providers (e.g., providers 108-112) or by EAN administrators 106 or by teachers, acting as one of the system users 116. The interconnection technique, however, may be used in other implementations for example in a students My Stack page to allow a student who collects cue cards and news elements to create their own personalized interconnections, which may be color coded depending on the topic or reasoning for the connection. For example, a student may define their own Tags and use these Tags as the basis for interconnecting stored media assets containing the same Tags.

Figure 23:
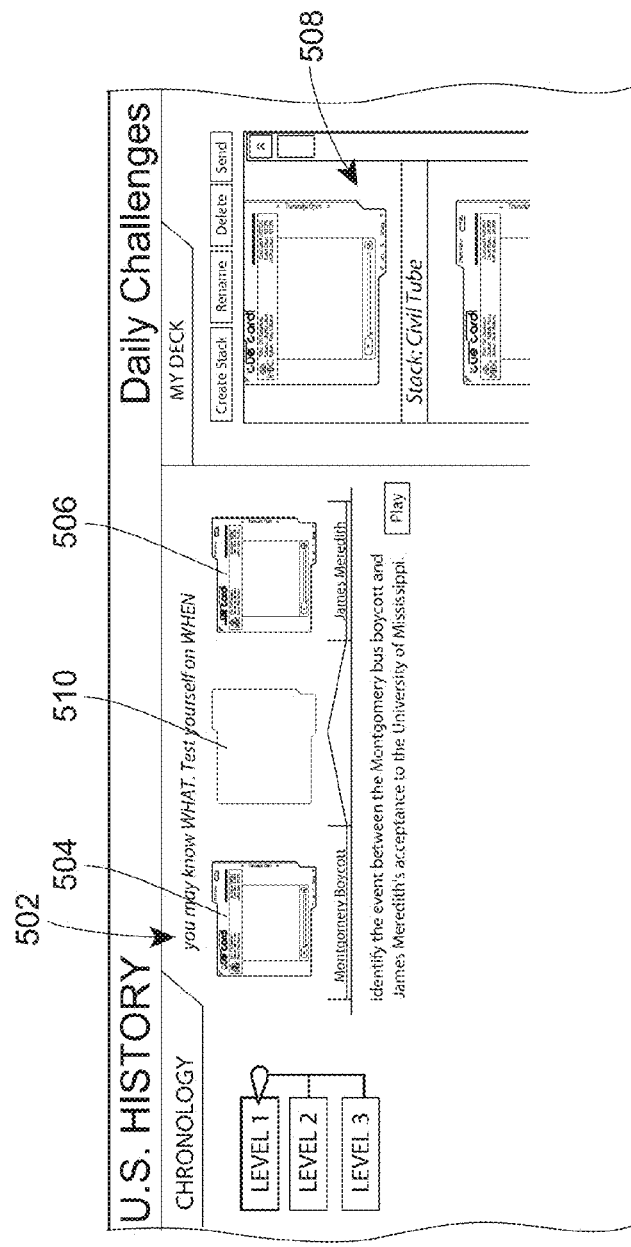
FIGS. 23-25 illustrate example depictions of a system by which a user is able to select various multi-sided news elements that are related to other multi-sided news elements to create a chronology of related multi-sided news elements for the example education and archival news system of FIG. 14.
Figure 24:
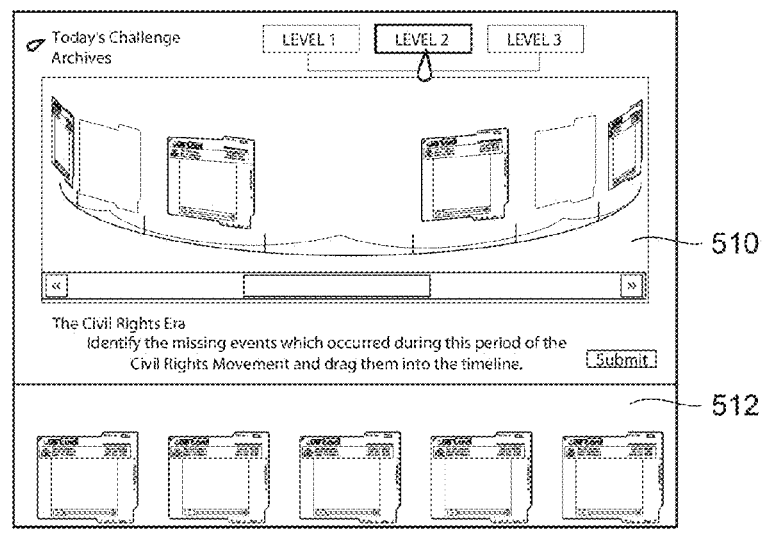
Figure 25:
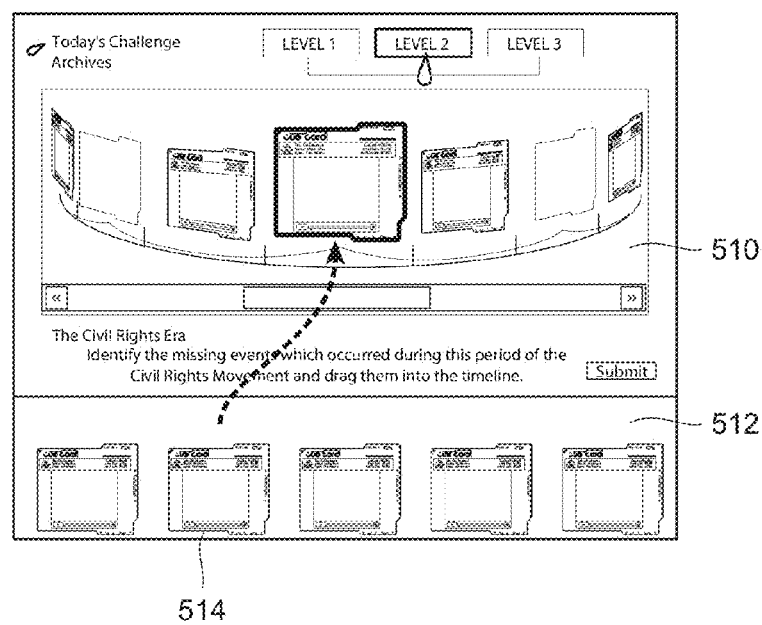

FIGS. 23-25 illustrate another educational game that may be played by relating multi-sided cue cards or news elements to one another. In a Chronology game, the engine 100 may present a student with a set of previously associated multi-sided cue cards or news elements as shown in a region 502 of FIG. 23. The region 502 includes two cue cards 504 and 506 and a game clue telling the student what is required, such as identify the event or events linking the two cue cards 504 and 506. The student will then look in their My Deck section 508 or to a separate window (not shown) for cue cards/news elements that satisfy the request, which are then selected by the student and populated into a open cue card/news element region 510. The engine 100 will assess the user's selection and indicate whether the selection is accurate or not. To play the game, the student will be allowed to view the different sides of the cue card/news element.

In some examples, the chronology presented in region 502 may be pre-determined by the teacher for a particular course or assignment. In other examples, the engine 100 may be programmed to automatically generate a chronology based on the cue cards/news elements in a students My Deck section. That is, for example, the engine 100 may analyze the students My Deck section, assess whether any of the cue cards/news elements are related in a chronological manner to other existing cue cards/news elements, stored in the system, and then the engine 100 may create a chronology game in which the answers are available from the students My Deck section. Such automated Chronology game generation may encourage students to continue searching for new cue cards/news elements and may be used to tailor more complex chronologies to those students with larger My Decks, allowing the more successful students to be presented with more different challenges as time goes on.

FIG. 23 illustrates a level 1 implementation of the interconnectivity functionality that may be achieved with multi-sided cue cards/news elements. FIGS. 24 and 25 show examples of a more complex (level 2) implementation, in which students are presented with a three-dimensional chronology 510 (a rotatable cylinder) that contains numerous cue cards/news elements that must be connected through addition of multiple cue cards/news elements displayed in a window 512. FIG. 24 illustrates the game prior to user selection; FIG. 25 illustrates the game after the user has begun to populate cue cards into the chronology, leaving a shadow version 514 of the selected cue cards in the window 512.

As the multi-sided archival news or content elements may be extended to other environments outside of the educational context, the above-described interconnectivity may be extended as well. In business, financial, scientific, legal, and other environments were reports, news stories, data, scientific theorems, case law, etc. may be characterized by a multi-sided news element, users of the system may draw connections between news elements. For example, in the financial realm news elements may be created for each of different financial metrics for a company. One news element may reflect information derived from financial data from the company, including sales, return on investment, dividends, etc. and another news element may be designed for the entire market category for which that company is a participant. For the latter, a news element may be designed for an oil services marketplace, where each side of the news element provides information on a different company within the oil services marketplace. A specific news element for British Petroleum may then be interconnected by a user to the news element for the overall oil services marketplace. This connection may be made globally from one entire news element to another, or the connection made be from side to side, i.e., from facet to facet, where the connection is physically only between one side of a news element to another side of a news element. In this way, if a user selects one news element, then the system may arrange all interconnected news elements to the forefront, rotating (or otherwise positioning) those interconnected news elements so the actual side connected to the selected news element is displayed to the user. This will allow the user to more quickly assess why the interconnection has been made and whether the interconnection is useful to the user.

A similar implementation would be in a legal environment, where a particular case may be broken down into sub-topics of applicable law. The system would allow users to interconnect sides of a news element (in this case a case summary element) so that the side corresponding to particular area of the law may be separately and independently connected to other case summary elements for other cases, allowing users to more quickly identify, in a graphical manner, which cases pertain to a particular area of the law, legal concept, etc.

A similar implementation could be made with regards to sports and entertainment content. In any arena in which media content may be linked with information, a cue card or news element could be created and collected by users and in a manner that users are allowed to interconnect said cue cards or news elements. In fantasy sports application, for example, each player could be assigned a different cue card which media content on the player on one side and statistical data on another side. The graphical presentation of such information may be used to place cards into a GUI (graphical user interface) illustration of a starting lineup. Moreover, however, players may be able to link such cue cards to other player cue cards or cue cards for other events to graphically display an a user-determined interconnection between cards. For example, in a fantasy baseball setting, particular hitters that are known to have higher batting averages, on base percentages, slugging percentages, etc. against certain pitchers may have their cue cards connected to of those pitchers so that when a player desires to make a lineup change, the player can quickly assess whether favorable match-ups exist. By recording such interconnections between cue cards/news elements over time the player can build up their own personalized mapping of player match-ups, thereby giving that player and likely advantage over other players. This mapping could extend to other entertainment, where for example fans a particular movie or television show may be able to collect cue cards or news elements regarding characters, events within the production, and even events occurring in the real world and draw connections between such elements either for a users own consumption or as part of a promotion or game directed to promoting consumer interest in the production. This would be particularly useful for productions with multiple characters and storylines running simultaneously. In fact, in some examples, a system may be designed to poll users for creating interconnections between media content (video, text, audio, etc.) that includes events that have actually occurred in a production and events that are only eluded to or even in some case events that have yet to even occur. System administrators could set up a system to monitor the interconnections users make to track view trends and storyline and character interest as the production season progresses.

A Blog management page (not shown) may be provided to serve two purposes—to provide a space for students to write an essay (blog), and for students/teachers to rate a blog that they receive. Steps for writing a blog would include first clicking on Set Timer to replicate the experience of writing a timed essay during the AP exam. This feature is not required to complete the essay, which can write over the course of the week if desired. Next the student would Click on Save Draft to save a draft version of the blog and come back to this page to complete it at any time. Next the student would Click on Submit Final when you are ready to submit your blog for review.

Every time a student submits a new blog, a notification (email) is sent out to the teacher and five anonymous students indicating that there is a new blog waiting to be reviewed and rated. The teacher clicks on the hyperlink included in the notification email to go directly to the Blog Management Page in iCue.

The Blog Management page displays a list (Blog Title and Student Screen Name) of new blogs that have not been rated. The steps for rating a blog may be as follows. A student may click on 'View Blog' link/button displayed next to each Blog Title/Student screen name combination to read the new blog. A student may then complete form field of specific questions relating to the content/quality of the blog. Additional comments (optional) may be provided in the designated comments box before you submit your rating. Rating may be automatically generated by averaging the assigned values to questions (on a scale of 1 to 5). After you have rated a blog, on return visits to that blog, the ratings drop down will no longer be available to you. An example weekly blog 362 created by the EAN system is shown in FIG. 18.

Teachers' Lounge Page—The Teacher's Lounge section of the website is the teacher equivalent to the Student Center, a place where they can exchange ideas, share tips and skills and ask for help from other teachers, as well as build bridges to the other social networking sites where they may also be active participants. There should be automatic content filtering tools for discussion board, blog, and any user-generated content. iCue Administrators and administrators should have the ability to add additional filters. Similar to the Student Center version of 'Ask an Expert', this forum provides an opportunity for teachers to send a message to a Subject Matter Expert (coordinated through the iCue administrator), and for other teachers to add to the discussion. Teachers will be able to post study tips, ideas and learning strategies to help each other make the most of their class. Teachers can start a new discussion thread on any subject that they choose, whether it's course-related or not.

Figure 26:
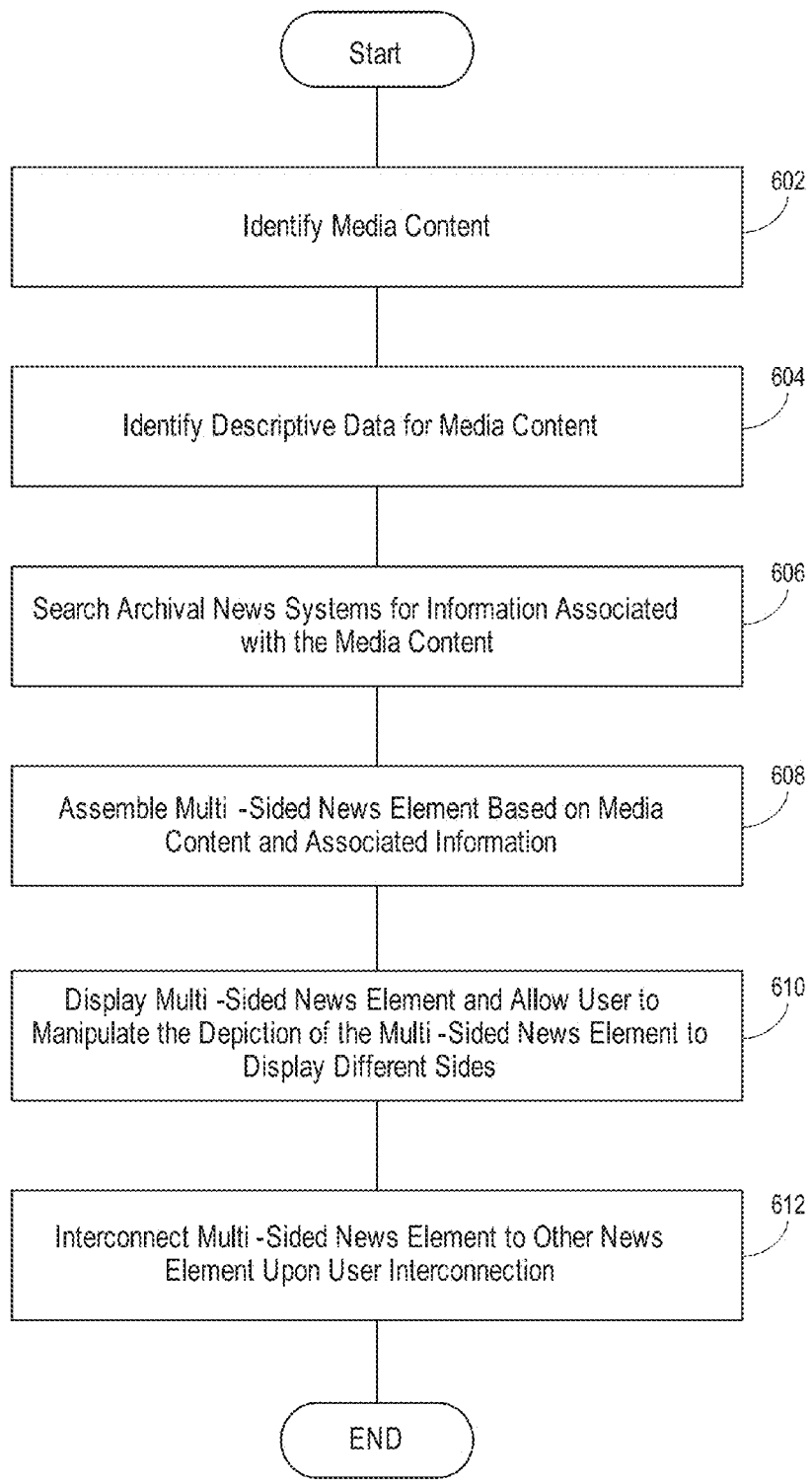
FIG. 26 illustrates a block diagram of a technique for displaying media content and associated information using a multi-sided media viewer.
Figure 29:
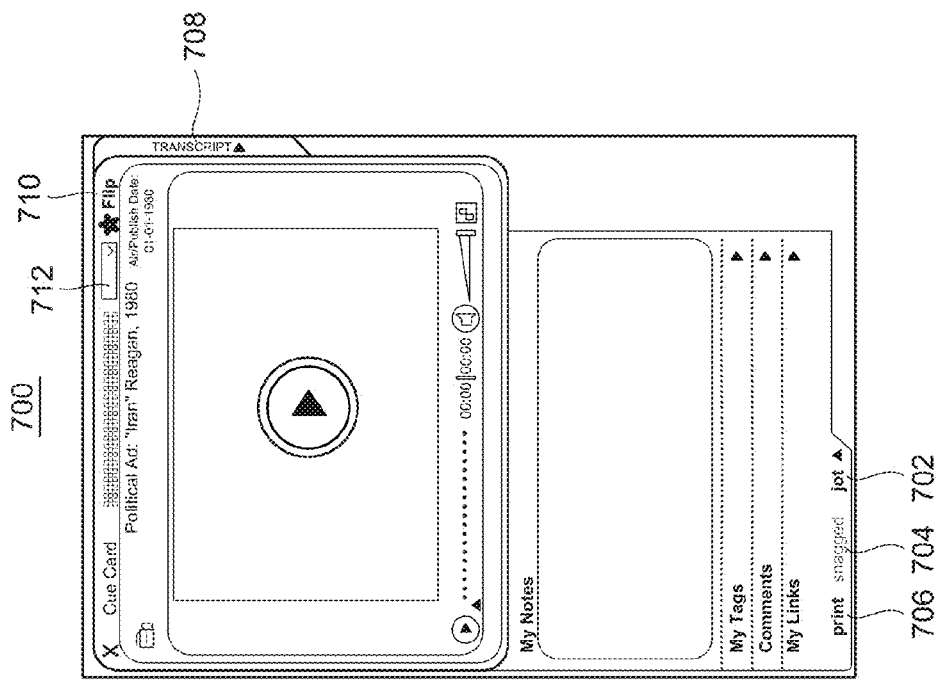
FIG. 29 illustrates the multi-sided cue card of FIG. 27 with another drawer exposed.
Figure 30:
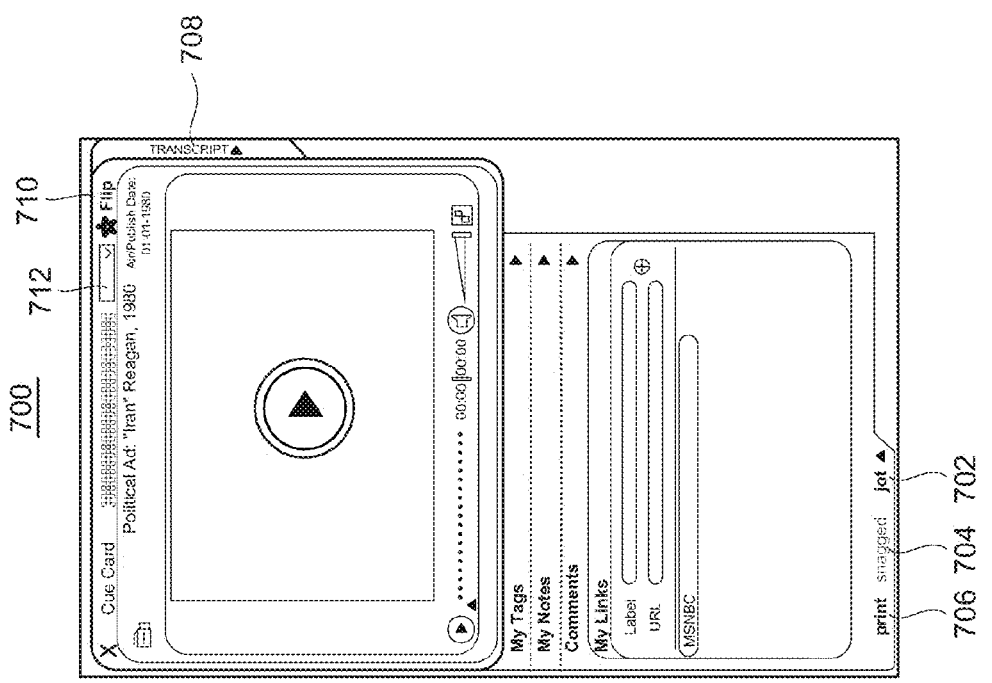
FIG. 30 illustrates the multi-sided cue card of FIG. 27 with yet another drawer exposed.
Figure 31:
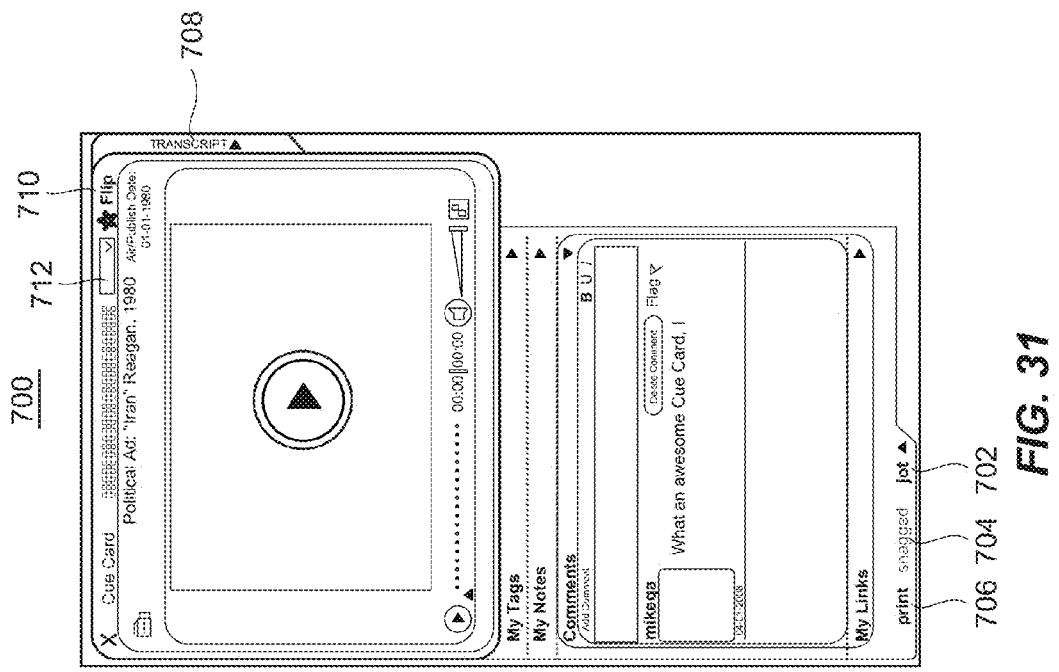
FIG. 31 illustrates the multi-sided cue card of FIG. 27 with yet another drawer exposed.

FIG. 26 illustrates an example technique 600 for displaying media content and associated information as discussed in examples hereinabove. A block 602 identifies media content of interest, such as media content presented to a student in Daily Challenge, Daily Question, Thought Starter, or other program. In some examples, the media content is automatically identified by an EAN system, while in other examples, the media content may be identified by the student interacting with the EAN system. Once identified, the EAN system may identify descriptive data related to the media content, such as keyword data or metadata, at a block 604. A block 606 takes that descriptive data and searches archival news systems for information associated with that media content. The EAN system may automatically poll databases for such archival news through a network, such as the Internet. Associated information is provided to a block 608 as part of media player cue card generator that assembles a multi-sided news element having a primary side for display the media content and one or more secondary sides displaying the associated information. For example, associated information from different archival news databases may each be displayed on a different side of the news element. A block 610 displays the multi-sided news element and allows a user to manipulate the depiction of that news element, for example by selecting tabs to flip or display secondary sides of a cue card type news element or by rotating a three-dimensional looking news element to allow the user to view other sides. Via a block 612 The user is then allowed to associate this news element with other news elements by drawing interconnections on between the first news element and any other news elements presented on a screen, for example, by using an input device connected to the EAN system like a mouse and keyboard. The block 610 is still active of course to allow the user to continue to manipulate the first news element, either while not affecting the depiction of the other connected news elements or by altering the depiction of the other interconnected news elements. It is noted that the media content may be stored on a first database and the archival news on other databases, which may be wholly separate from the first database or part of a master database along with the first database.

FIGS. 15-24 above provide example implementations of various features in accordance with some examples herein and FIGS. 6-9 provide example implementations of some two-dimensional news elements, in the form of cue cards. It is noted that the descriptions herein provided may are not limited to the particular displayed data and formatting as shown. FIGS. 27-33 illustrate another example implementation in accordance with the descriptions herein. FIG. 27, for example, shows a cue card 700 that in addition to having a jot button 702, a snag button 704, a print button 706, a transcript button 708, a flip button 710, and media player 712, all similar to like features described above, the cue card 700 also includes a favorites "Star" button 716 which by clicking allows the user to add this cue card to their "My Stack" window or page. FIGS. 28-31 show various drop down windows that may be presented to a user when they select the jot button 702.

Figure 32:
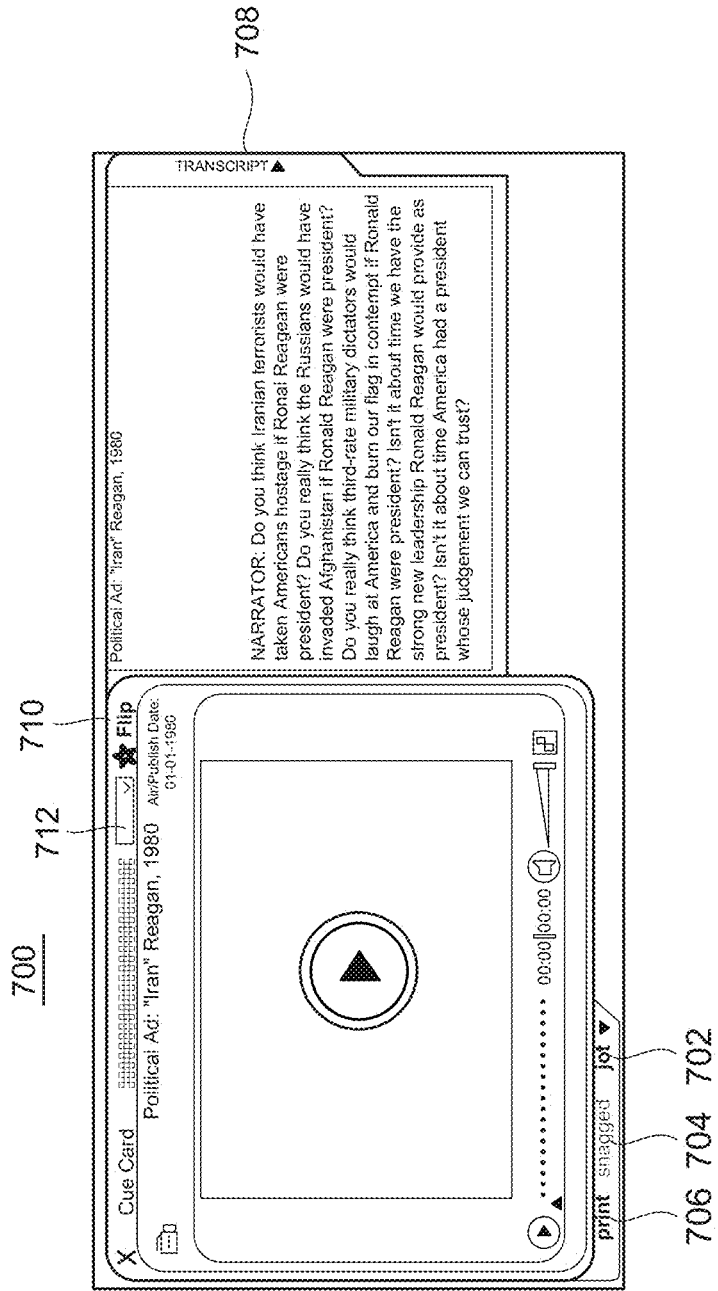
FIG. 32 illustrates the multi-sided cue card of FIG. 27 with a transcript drawer exposed.
Figure 33:
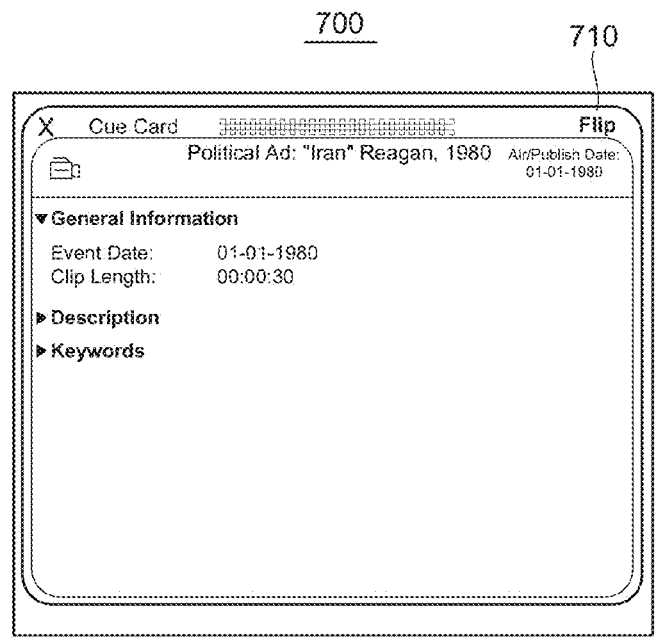
FIG. 33 illustrates an opposite side of the multi-sided cue card of FIG. 27.

FIG. 32 shows an example transcript drawer window that may be presented to a user in response to selection of the transcript drawer button 708. FIG. 33 shows the opposite side of the cue card 700, showing detailed information such as General information like the event date and video news element video clip length. Other information fields include description data that may be grabbed automatically by the EAN from originating news or information database or associated databases or that may be created by the teacher or game administrator. A keywords data field is also provided, along with the same news header 718 from the media player side of the cue card.

Figure 34:
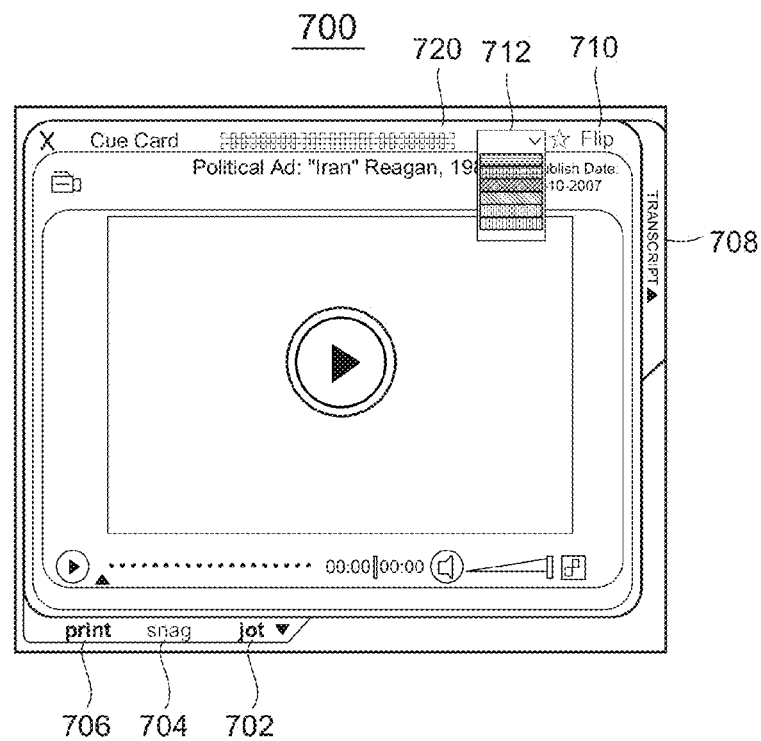
FIG. 34 illustrates the multi-sided cue card of FIG. 27 with a favorites labeling drawer exposed.
Figure 36:
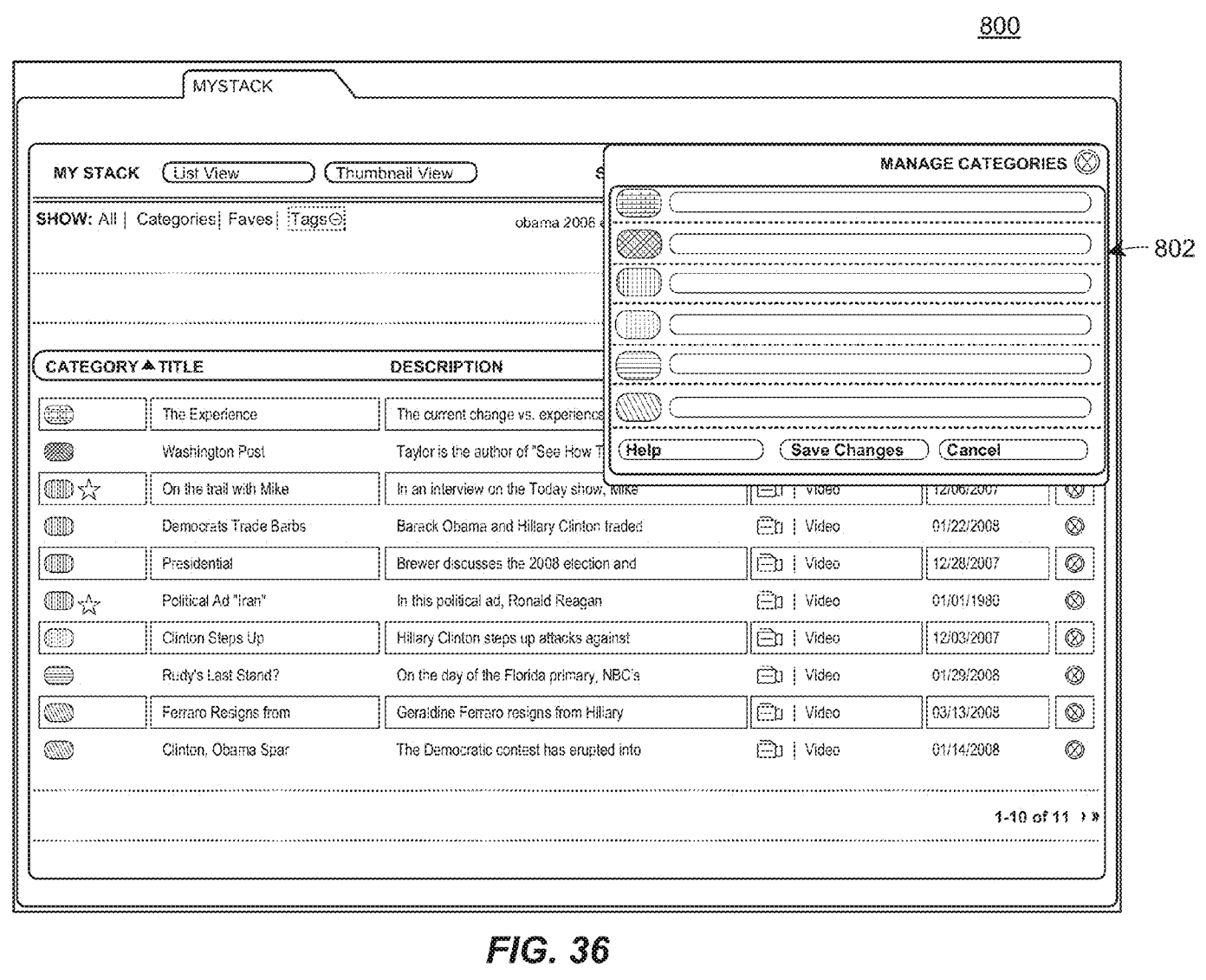

Returning to FIG. 27, adjacent the star button 714 is a pull down color code menu 720 that may be used to categorize the type of cue card. FIG. 34 shows the color code menu 720 after with the optional colors for selection (colors shown in difference hashes for illustration purposes). FIG. 35 shows an example My Stack page 800 showing all of the cue cards or other multi-sided news elements, color coded and arranged and listed in a description view. The My Stack page 800 could illustrate all of these news elements simultaneously in a thumbnail view and to allow on screen manipulation and rotation as desired. FIG. 36 shows the same My Stack page 800, but with a manage categories windows 802 that can be used to control the categorizations assigned to each of the color codes.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A system for displaying media content, the system comprising:
    a processor;
    and a memory storing computer-readable instructions that when executed by the processor cause the system to,
        obtain the media content and associated information related to the media content from one or more servers, wherein the media content comprises video of an archived news event, generate a multi-sided news element having a primary side to display the media content and at least one secondary side to display the associated information, wherein the instructions are further configured to adapt the number of sides of the multi-sided news element depending on the media content and associated information to be displayed on the multi-sided news element, allow a user to manipulate, on a display screen, the depiction of the multi-sided news element, including which side or sides of the multi-sided news element are visible on the display screen, allow the user to modify and store personalized information for display on the multi-sided news element, send, at least some, stored personalized information to a central server for making the sent personalized information accessible for display on other multi-sided news elements of other users with access to the central server, obtain from the centralized server personalized information from the other users for display on the multi-sided news element, selectively allow and block user access to content on at least one side of the multi-sided news element, where at least one primary side or secondary side is adapted to allow multiple users to independently store and/or modify stored personalized information for display on the multi-sided news element, selectively block from display personalized information from another user, and store the multi-sided news elements with other multi-sided news elements for access by the user;

wherein the system is part of a social networking environment having other users, the memory stores further computer-readable instructions that when executed by the processor cause the system to optionally receive from the user a keyword associated with the media content to provide additional keyword searching of the multi-sided news element by other users of the social networking environment.

2. The system of claim 1, where the multi-sided news element is either a two-sided cue card or a three-dimensionally depicted element having more than two sides.

3. The system of claim 1, wherein the memory stores further computer-readable instructions that when executed by the processor cause the system to adapt the size of at least one side of the multi-sided news element depending on the amount of content to be displayed thereon.

4. The system of claim 1, wherein the memory stores further computer-readable instructions that when executed by the processor cause the system to display content from different databases on different sides of the multi-sided news element.

5. The system of claim 1, where the multi-sided news element is a two-sided cue card, wherein the memory stores further computer-readable instructions that when executed by the processor cause the system to provide on a first side of the cue card a first tab that when selected by the user exposes a window through which the user may enter personalized information related to the content.

6. The system of claim 5, wherein the memory stores further computer-readable instructions that when executed by the processor cause the system to provide on the first side of the cue card a second tab that when selected by a user exposes a window containing a transcript related to the content.

7. The system of claim 5, wherein the memory stores further computer-readable instructions that when executed by the processor cause the system to provide on the first side of the cue card a video media player for playing video content.

8. The system of claim 1, wherein the memory stores further computer-readable instructions that when executed by the processor cause the system to, display thumbnails of the multiple multi-sided news elements, and in response to a user selecting one of the thumbnails, displaying the multi-sided news element that corresponds to the selected thumbnail.

9. The system of claim 8, wherein the memory stores further computer-readable instructions that when executed by the processor cause the system to display stored personalized information from different users on different sides of the multi-sided news element.

10. The system of claim 1, wherein the memory stores further computer-readable instructions that when executed by the processor cause the system to allow the user to specify which other users have access to the personalized information.

11. The system of claim 1, wherein the personalized information comprises comments provided by the user onto the multi-sided news element.

12. The system of claim 1, wherein the memory stores further computer-readable instructions that when executed by the processor cause the system to allow users to generate a user-created multi-sided news element containing media content developed by the user, and publish the user-created multi-sided news element to a central server for access by other users with access to the central server.

13. A non-transitory computer-readable storage medium containing computer-readable instructions for displaying media content, the instructions when executed, cause a computer to:

obtain the media content and associated information related to the media content from one or more servers, wherein the media content comprises video of an archived news event;

and generate a multi-sided news element having a primary side to display the media content and at least one secondary side to display the associated information, wherein the instructions are further configured to adapt the number of sides of the multi-sided news element depending on the media content and associated information to be displayed on the multi-sided news element, allow a user to manipulate, on a display screen, the depiction of the multi-sided news element, including which side or sides of the multi-sided news element are visible on the display screen;

allow the user to modify and store personalized information for display on the multi-sided news element, send, at least some, stored personalized information to a central server for making the sent personalized information accessible for display on other multi-sided news elements of other users with access to the central server, obtain from the centralized server personalized information from the other users for display on the multi-sided news element, selectively allow and block user access to content on at least one side of the multi-sided news element, where at least one primary side or secondary side is adapted to allow multiple users to independently store and/or modify stored personalized information for display on the multi-sided news element, selectively block from display personalized information from another user, and store the multi-sided news elements with other multi-sided news elements for access by the user;

wherein the system is part of a social networking environment having other users, the memory stores further computer-readable instructions that when executed by the processor cause the system to optionally receive from the user a keyword associated with the media content to provide additional keyword searching of the multi-sided news element by other users of the social networking environment.

14. The computer-readable medium of claim 13, where the multi-sided news element is either a two-sided cue card or a three-dimensionally depicted element having more than two sides.

15. The computer-readable medium of claim 13, wherein the computer-readable medium contains further instruction that when executed cause the computer to adapt the size of at least one side of the multi-sided news element depending on the amount of content to be displayed thereon.

16. The computer-readable medium of claim 13, wherein the computer-readable medium contains further instruction that when executed cause the computer to display content from different databases on different sides of the multi-sided news element.

17. The computer-readable medium of claim 13, where the multi-sided news element is a two-sided cue card, wherein the computer-readable medium contains further instructions that when executed cause the computer to provide on a first side of the cue card a first tab that when selected by the user exposes a window through which the user may enter personalized information related to the content.

18. The computer-readable medium of claim 17, wherein the computer-readable medium contains further instructions that when executed cause the computer to provide on the first side of the cue card a second tab that when selected by a user exposes a window containing a transcript related to the content.

19. The computer-readable medium of claim 17, wherein the computer-readable medium contains further instructions that when executed cause the computer to provide on the first side of the cue card a video media player for playing video content.

20. The computer-readable medium of claim 13, wherein the computer-readable medium contains further instructions that when executed cause the computer to, display thumbnails of the multiple multi-sided news elements, and in response to a user selecting one of the thumbnails, displaying the multi-sided news element that corresponds to the selected thumbnail.

21. The computer-readable medium of claim 13, wherein the computer-readable medium contains further instruction that when executed cause the computer to display stored personalized information from different users on different sides of the multi-sided news element.

22. The computer-readable medium of claim 13, wherein the computer-readable medium contains further instruction that when executed cause the computer to allow the user to specify which other users have access to the personalized information.

23. The computer-readable medium of claim 13, wherein the personalized information comprises comments provided by the user onto the multi-sided news element.

24. The computer-readable medium of claim 13, wherein the computer-readable medium contains further instruction that when executed cause the computer to allow users to generate a user-created multi-sided news element containing media content developed by the user, and publish the user-created multi-sided news element to a central server for access by other users with access to the central server.

25. A computer-implemented method for displaying media content, the method comprising:

obtaining the media content and associated information related to the media content from one or more servers, wherein the media content comprises video of an archived news event;

and generating a multi-sided news element having a primary side to display the media content and at least one secondary side to display the associated information, wherein the method further comprises adapting the number of sides of the multi-sided news element depending on the media content and associated information to be displayed on the multi-sided news element, allowing a user to manipulate the depiction of the multi-sided news element, including which side or sides of the multi-sided news element are visible on the display screen, allowing the user to modify and store personalized information for display on the multi-sided news element, send, at least some, stored personalized information to a central server for making the sent personalized information accessible for display on other multi-sided news elements of other users with access to the central server, obtaining from the centralized server personalized information from the other users for display on the multi-sided news element, selectively allowing and blocking user access to content on at least one side of the multi-sided news element, where at least one primary side or secondary side is adapted to allow multiple users to independently store and/or modify stored personalized information for display on the multi-sided news element, selectively blocking from display personalized information from another user, and storing the multi-sided news elements with other multi-sided news elements for access by the user;

wherein the system is part of a social networking environment having other users, the memory stores further computer-readable instructions that when executed by the processor cause the system to optionally receive from the user a keyword associated with the media content to provide additional keyword searching of the multi-sided news element by other users of the social networking environment.

26. The computer-implemented method of claim 25, where the multi-sided news element is either a two-sided cue card or a three-dimensionally depicted element having more than two sides.

27. The computer-implemented method of claim 25, wherein the method further comprises adapting the size of at least one side of the multi-sided news element depending on the amount of content to be displayed thereon.

28. The computer-implemented method of claim 25, wherein the method further comprises displaying content from different databases on different sides of the multi-sided news element.

29. The computer-implemented method of claim 25, where the multi-sided news element is a two-sided cue card, wherein the method further comprises providing on a first side of the cue card a first tab that when selected by the user exposes a window through which the user may enter personalized information related to the content.

30. The computer-implemented method of claim 29, wherein the method further comprises providing on the first side of the cue card a second tab that when selected by a user exposes a window containing a transcript related to the content.

31. The computer-implemented method of claim 29, wherein the method further comprises providing on the first side of the cue card a video media player for playing video content.

32. The computer-implemented method of claim 25, wherein the method further comprises displaying stored personalized information from different users on different sides of the multi-sided news element.

33. The computer-implemented method of claim 25, wherein the method further comprises allowing the user to specify which other users have access to the personalized information.

34. The computer-implemented method of claim 25, wherein the personalized information comprises comments provided by the user onto the multi-sided news element.

35. The computer-implemented method of claim 25, wherein the method further comprises allowing users to generate a user-created multi-sided news element containing media content developed by the user, and publish the user-created multi-sided news element to a central server for access by other users with access to the central server.

\* \* \* \* \*